US010259966B2

(12) United States Patent
Onoe et al.

(10) Patent No.: US 10,259,966 B2
(45) Date of Patent: Apr. 16, 2019

(54) RESIN DISPERSION, COATING MATERIAL, LAMINATE, AND PROCESSES FOR THEIR PRODUCTION

(71) Applicant: Mitsubishi Chemical Corporation, Chiyoda-ku (JP)

(72) Inventors: Masato Onoe, Yokkaichi (JP); Toshiya Seko, Yokkaichi (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 1051 days.

(21) Appl. No.: 14/512,574

(22) Filed: Oct. 13, 2014

(65) Prior Publication Data

US 2015/0125688 A1 May 7, 2015

Related U.S. Application Data

(63) Continuation of application No. 12/282,353, filed as application No. PCT/JP2006/324090 on Dec. 1, 2006, now abandoned.

(30) Foreign Application Priority Data

Mar. 10, 2006 (JP) ................................. 2006-066106

(51) Int. Cl.
C09D 123/36 (2006.01)
B32B 27/08 (2006.01)
C08F 210/06 (2006.01)
C08F 255/00 (2006.01)
C08F 255/02 (2006.01)
C08F 255/08 (2006.01)
C08F 287/00 (2006.01)
C08J 3/05 (2006.01)
C08J 7/04 (2006.01)
C08L 51/00 (2006.01)
C08L 51/06 (2006.01)
C09D 5/00 (2006.01)
C09D 11/102 (2014.01)
C09D 151/00 (2006.01)
C09D 151/06 (2006.01)
C09J 151/06 (2006.01)

(52) U.S. Cl.
CPC ............ C09D 123/36 (2013.01); B32B 27/08 (2013.01); C08F 210/06 (2013.01); C08F 255/00 (2013.01); C08F 255/02 (2013.01); C08F 255/08 (2013.01); C08F 287/00 (2013.01); C08J 3/05 (2013.01); C08J 7/047 (2013.01); C08L 51/006 (2013.01); C08L 51/06 (2013.01); C09D 5/002 (2013.01); C09D 11/102 (2013.01); C09D 151/006 (2013.01); C09D 151/06 (2013.01); C09J 151/06 (2013.01); C08J 2300/22 (2013.01); C08J 2387/00 (2013.01); C08J 2423/36 (2013.01); C08J 2487/00 (2013.01); C08L 2201/50 (2013.01); Y10T 428/254 (2015.01); Y10T 428/31855 (2015.04); Y10T 428/31938 (2015.04)

(58) Field of Classification Search
None
See application file for complete search history.

(56) References Cited

U.S. PATENT DOCUMENTS

| 5,783,630 | A | 7/1998 | Evans et al. |
|---|---|---|---|
| 5,965,667 | A | 10/1999 | Evans et al. |
| 6,140,416 | A | 10/2000 | Evans et al. |
| 6,774,181 | B1 | 8/2004 | Bechara et al. |
| 6,887,943 | B2 | 5/2005 | Onoe et al. |
| 7,122,604 | B2 | 10/2006 | Onoe et al. |
| 7,304,111 | B2 | 12/2007 | Onoe et al. |
| 7,659,356 | B2 | 2/2010 | Ashihara et al. |
| 2001/0039312 | A1 | 11/2001 | Evans et al. |
| 2003/0153686 | A1 | 8/2003 | Onoe et al. |
| 2004/0162403 | A1 | 8/2004 | Shimizu et al. |
| 2005/0032959 | A1 | 2/2005 | Cheung et al. |
| 2005/0100754 | A1 | 5/2005 | Moncla et al. |
| 2005/0124753 | A1 | 6/2005 | Ashihara et al. |
| 2005/0143527 | A1 | 6/2005 | Tsuneka et al. |
| 2006/0025535 | A1 | 2/2006 | Onoe et al. |
| 2006/0178486 | A1 | 8/2006 | Suzuki et al. |
| 2007/0037923 | A1 | 2/2007 | Shiba et al. |

(Continued)

FOREIGN PATENT DOCUMENTS

DE 101 23 825 A1 11/2002
EP 0 634 424 A1 1/1995

(Continued)

OTHER PUBLICATIONS

Korean Office Action dated Nov. 12, 2012, in Korea Patent Application No. 10-2008-7021880 (with English translation).

(Continued)

Primary Examiner — Chinessa T. Golden
(74) Attorney, Agent, or Firm — Oblon, McClelland, Maier & Neustadt, L.L.P.

(57) ABSTRACT

A resin dispersion having, dispersed in water with a 50% particle diamter of at most 0.5 μm, a polymer (C) having a hydrophilic polymer (B) or an acidic group bonded to a propylene/α-olefin copolymer (A) as a copolymer of propylene with an α-olefin other than propylene, where the copolymer (A) has a propylene content of at least 50 mol% and less than 100 mol% and the copolymer (A) has a weight average molecular weight Mw of at least 10,000 and a molecular weight distribution Mw/Mn of at most 3.5, and the resin dispersion has a surfactant content of at most 15 parts by weight per 100 parts by weight of the polymer (C).

16 Claims, No Drawings

(56) References Cited

U.S. PATENT DOCUMENTS

| | | |
|---|---|---|
| 2009/0092847 A1 | 4/2009 | Onoe et al. |
| 2009/0226728 A1 | 9/2009 | Onoe et al. |
| 2012/0135243 A1 | 5/2012 | Onoe et al. |

FOREIGN PATENT DOCUMENTS

| | | |
|---|---|---|
| EP | 1 162 233 | 12/2001 |
| EP | 1 500 680 A1 | 1/2005 |
| JP | 3-182534 | 8/1991 |
| JP | 4-288336 | 10/1992 |
| JP | 5-105790 | 4/1993 |
| JP | 6-80845 | 3/1994 |
| JP | 6-256592 | 9/1994 |
| JP | 07-109359 | 4/1995 |
| JP | 7-145216 | 6/1995 |
| JP | 10-231402 | 9/1998 |
| JP | 2000-344972 | 12/2000 |
| JP | 2001-98140 | 4/2001 |
| JP | 2001-288372 | 10/2001 |
| JP | 2004-2842 | 1/2004 |
| JP | 2004-18659 | 1/2004 |
| JP | 2004-83787 | 3/2004 |
| JP | 2004-115712 | 4/2004 |
| JP | 2004-269872 | 9/2004 |
| JP | 2005-126482 | 5/2005 |
| JP | 2005-126615 | 5/2005 |
| JP | 2005-272793 | 10/2005 |
| JP | 2006-036920 | 2/2006 |
| JP | 2006-83373 | 3/2006 |
| JP | 2006-143893 | 6/2006 |
| JP | 2006-348128 | 12/2006 |
| JP | 2007-246871 | 9/2007 |
| JP | 2007-270122 | 10/2007 |
| JP | 2009-287034 | 12/2009 |
| JP | 2010-185084 | 8/2010 |
| JP | 2010-189658 | 9/2010 |
| WO | 97/03108 | 1/1997 |

OTHER PUBLICATIONS

Onoe, M., et al., Propylene Copolymer, Composition Containing the Same and Method for Producing the Same, Sep. 30, 2004 translation of JP 2004-269872A.

Yamada, A., et al., Water-Based Coating and Film and Laminated Film on Which the Same Coating is Printed, Mar. 18, 2004 translation of JP 2004-083787A.

Japanese Office Action dated Dec. 14, 2010, in Patent Application No. 2006-325899 (with English-language translation).

Japanese Office Action dated Dec. 14, 2010, in Patent Application No. 2009-203942 (with English-language translation).

"The Jeffamine® Polyoxyalkyleneamines", Huntsman Corporation Mitsui Fine Chemicals, Inc., pp. 1-4, (with English translation), Apr. 1, 2004.

Japanese Official Notification dated Aug. 3, 2010, in Patent Application No. 2006-325899 (with English-language translation).

Japanese third party Information Offer Form dated Jul. 5, 2010, in Patent Application No. 2006-325899 (with English-language translation).

U.S. Appl. No. 13/365,319, filed Feb. 3, 2012, Onoe, et al.

RESIN DISPERSION, COATING MATERIAL, LAMINATE, AND PROCESSES FOR THEIR PRODUCTION

This application is a continuation of U.S. application Ser. No. 12/282,353 filed Sep. 10, 2008, which is a National Stage of PCT/JP2006/324090 filed Dec. 1, 2006, both of which are incorporated herein by reference. This application also claims the benefit of JP 2006-066106 filed Mar. 10, 2006.

TECHNICAL FIELD

The present invention relates to an aqueous resin dispersion containing a propylene polymer, a coating material containing it, and a laminate; and processes for their production.

BACKGROUND ART

Polyolefins such as propylene polymers or propylene-α-olefin copolymers are inexpensive and yet excellent in mechanical properties, heat resistance, chemical resistance, water resistance, etc., and thus, they are used in various fields. However, such polyolefins have no polar groups in their molecules and thus are usually of low polarity and difficult to bond or apply for coating, and their improvements have been desired. Accordingly, various methods have been tried such as a method for chemical treatment of the surface of a polyolefin molded product with a reagent or the like, or a method for oxidation treatment of the surface of a molded product by such a means as corona discharge treatment, plasma treatment or flame treatment. However, such methods not only require special apparatus but also the effects for improving the coating property or the adhesive property have not been necessarily adequate.

Therefore, in an attempt to impart a good coating property or adhesive property to a polyolefin such as a propylene polymer by a relatively simple method, a so-called chlorinated polypropylene or an acid-modified propylene-α-olefin copolymer, and further an acid-modified chlorinated polypropylene have been developed. Such a modified polyolefin is applied to the surface of a polyolefin molded product as a surface treating agent, an adhesive or a coating material. The modified polyolefin is usually applied in the form of a solution in an organic solvent or a dispersion in water. With a view to safety and health, and reduction of environment pollution, an aqueous dispersion is usually preferably employed.

Such an aqueous dispersion may, for example, be a resin dispersion having an acid-modified chlorinated polypropylene dispersed in water by using a surfactant and a basic substance (Patent Document 1) or a resin dispersion having an acid-modified polyolefin dispersed in water by using a surfactant and a basic substance (Patent Document 2). However, such a resin dispersion has had a problem that in order to make dispersed particle sizes to be fine, it is required to add a large amount of a surfactant, and consequently, a coating material employing such a resin dispersion is poor in water resistance or chemical resistance. Further, after coating, the surfactant may sometimes bleed out on the coated surface. On the other hand, if the amount of the surfactant is reduced, the particle sizes of dispersed resin tend to be large, and there has been a problem in storage stability. In an emulsified system using a surfactant, it has been difficult to satisfy all of such requirements, and a further improvement has been desired. Further, in Patent Document 1, a chlorinated polypropylene having the melting point made relatively low is employed to secure the dispersibility of the resin, but with a view to preventing environmental pollution, it is desired to reduce the amount of chlorine to be used.

As another example, there is a resin dispersion having dispersed in water a polymer having functional segments block-copolymerized to polypropylene segments (Patent Document 3). However, the dispersed particle sizes of the ethylene copolymer or polypropylene homopolymer can not be said to be sufficiently fine, and it is not possible to form the dispersion without using a surfactant at all. Thus, a further improvement has been desired.

Under the circumstances, a polyolefin aqueous dispersion has been proposed wherein a polyolefin having a large amount of an unsaturated carboxylic acid grafted to a propylene/α-olefin copolymer, is dispersed in the presence of a base (Patent Document 4). However, since a propylene/α-olefin copolymer having a wide molecular weight distribution and having copolymerizability not controlled, is used, it is required to use a pressure resistant vessel and to use a special method for dispersion at a temperature of at least the boiling point of water or the solvent, in order to make the dispersed particle diameter to be fine.

Further, an aqueous dispersion has been proposed wherein a maleic anhydride-modified chlorinated propylene/ethylene copolymer having a chlorinated propylene/ethylene copolymer modified with maleic anhydride is dispersed in the presence of a base (Patent Document 5). However, the molecular weight of the raw material to be used is very low at a level of 6,500, whereby the aqueous dispersion is inferior in the adhesion to the polyolefin substrate, water resistance and chemical resistance.

On the other hand, as a propylene/α-olefin copolymer to be used, it is proposed to use a propylene/α-olefin copolymer having a narrow molecular weight distribution and a copolymer arrangement being random and uniform, which is prepared by a metallocene catalyst, instead of a propylene/α-olefin copolymer which is prepared by means of a Ziegler-Natta catalyst (Patent Document 5). It is disclosed that it is thereby possible to obtain an aqueous dispersion excellent in the low temperature heat sealing property. However, it is still essential to use a surfactant, the stability is poor with large particle sizes, and there still remain such a problem as bleeding out due to the surfactant or poor chemical resistance.

Further, an aqueous dispersion is also proposed wherein no α-olefin is used, and only a polypropylene having a stereo-block structure is used (Patent Document 6). However, it is still essential to use a surfactant, and there still remains such a problem as bleeding out.

Patent Document 1: JP-A-10-231402
Patent Document 2: JP-A-6-256592 (U.S. Pat. No. 5,534, 577)
Patent Document 3: JP-A-2001-288372 (U.S. Patent Application Publication No. 2003-055179)
Patent Document 4: JP-A-2005-126482
Patent Document 5: JP-A-3-182534
Patent Document 6: JP-A-2000-344972
Patent Document 7: JP-A-2004-002842 (U.S. Patent Application Publication No. 2005-124753)

DISCLOSURE OF THE INVENTION

Objects to be Accomplished by the Invention

The present invention is to provide an aqueous dispersion of a resin, whereby dispersed particles are fine and stable, and bleeding out due to a surfactant is suppressed, and which is excellent in chemical resistance and water resistance and useful as a surface treating agent, adhesive or coating material excellent in adhesion to an olefin polymer having crystallinity. Further, it is to provide a coating material containing such an aqueous dispersion, a laminate and a process for its production.

Means to Accomplish the Objects

The present inventors have conducted an extensive study to accomplish the above objects and as a result, have found it possible to obtain a resin dispersion having excellent characteristics by dispersing in water a polymer having a hydrophilic polymer bonded in a prescribed proportion or having an acid group bonded to a propylene/α-olefin copolymer having specific characteristics, without using a surfactant or together with a very small amount of a surfactant.

Namely, the present invention provides a resin dispersion having, dispersed in water with a 50% particle diameter of at most 0.5 μm, a polymer (C) having a hydrophilic polymer (B) or an acidic group bonded to a propylene/α-olefin copolymer (A) as a copolymer of propylene with an α-olefin other than propylene, wherein: the copolymer (A) has a propylene content of at least 50 mol % and less than 100 mol %, and the copolymer (A) has a weight average molecular weight Mw of at least 10,000 and a molecular weight distribution Mw/Mn of at most 3.5; and the resin dispersion has a surfactant content of at most 15 parts by weight per 100 parts by weight of the polymer (C).

Further, the present invention provides the resin dispersion, wherein the copolymer (A) is produced by means of a single-site catalyst.

Further, the present invention provides the resin dispersion, wherein the copolymer (A) is a propylene/butene copolymer.

Furthermore, the present invention provides the resin dispersion, wherein the copolymer (A) has a melting point Tm of at most 100° C. and a heat of crystal fusion ΔH of at most 60 J/g.

Furthermore, the present invention provides the resin dispersion, wherein the copolymer (A) elutes at least 95% at a temperature of at most 60° C. in temperature rising elution fractionation.

Further, the present invention provides the resin dispersion, wherein the copolymer (A) contains substantially no chlorine.

Furthermore, the present invention provides the resin dispersion, wherein the polymer (C) is dispersed in water with a 50% particle diameter of at most 0.3 μm.

Further, the present invention provides the resin dispersion, wherein the polymer (C) has a hydrophilic polymer (B) bonded to the copolymer (A) in a ratio of (A):(B)=100:1 to 100:500 (weight ratio) or has an acidic group bonded to the copolymer (A).

Further, the present invention provides the resin dispersion, wherein the polymer (C) has a hydrophilic polymer (B) bonded to the copolymer (A).

Further, the present invention provides the resin dispersion, wherein the polymer (C) is a graft copolymer having a hydrophilic polymer (B) graft-bonded to the copolymer (A).

Further, the present invention provides the resin dispersion, wherein the polymer (C) has from 0.01 to 5 mmol of a hydrophilic polymer (B) bonded per 1 g of the copolymer (A).

Further, the present invention provides the resin dispersion, wherein the hydrophilic polymer (B) is a polyether resin.

Further, the present invention provides the resin dispersion, wherein the hydrophilic polymer (B) has at least one reactive group per one molecule.

Further, the present invention provides the resin dispersion, wherein the hydrophilic polymer (B) has an amino group as the reactive group.

Further, the present invention provides the resin dispersion, which contains substantially no surfactant.

The present invention further provides a process for producing a resin dispersion having the polymer (C) dispersed in water and having a surfactant content of at most 15 parts by weight per 100 parts by weight of the polymer (C), which comprises preparing a mixture comprising the polymer (C), water and a solvent other than water, and then removing the solvent from the mixture to obtain a resin dispersion.

The present invention further provides a resin dispersion comprising the polymer (C), at least one resin (D) selected from the group consisting of an acrylic resin, a polyester resin, a polyurethane resin and an epoxy resin, and water, wherein the mass ratio of the copolymer (A) to the resin (D) is from 90:10 to 10:90, the mass ratio of the total amount of the polymer (C) and the resin (D) to water is from 5:95 to 60:40, and the surfactant content is at most 15 parts by weight per 100 parts by weight of the total amount of the polymer (C) and the resin (D).

Further, the present invention provides the resin dispersion, wherein particles made of the polymer (C) and particles made of the resin (D) are respectively dispersed in water.

Furthermore, the present invention provides the resin dispersion which further contains a pigment, wherein the mass ratio of the total amount of the polymer (C) and the resin (D) to the pigment is from 100:10 to 100:400.

The present invention further provides a process for producing a resin dispersion, which comprises obtaining a resin dispersion having the polymer (C) and the resin (D) dispersed in water and having a surfactant content of at most 15 parts by weight per 100 parts by weight of the total amount of the polymer (C) and the resin (D), wherein a dispersion having the polymer (C) dispersed in water, and a dispersion having the resin (D) dispersed in water, are mixed.

The present invention further provides a coating material containing the above resin dispersion.

The present invention further provides a laminate having formed on a thermoplastic resin-molded product (F) a layer comprising a polymer (C) having a hydrophilic polymer (B) or an acidic group bonded to a propylene/α-olefin copolymer (A) as a copolymer of propylene with an α-olefin other than propylene, wherein the copolymer (A) has a propylene content of at least 50 mol % and less than 100 mol %, and the copolymer (A) has a weight average molecular weight Mw of at least 10,000 and a molecular weight distribution Mw/Mn of at most 3.5; and the surfactant content is at most 15 parts by weight per 100 parts by weight of the polymer (C).

Further, the present invention provides a laminate having a resin layer formed by applying and heating the above resin dispersion or the above coating material, on a thermoplastic resin-molded product (F).

The present invention further provides a process for producing a laminate, which comprises applying and heating the above resin dispersion or the above coating material to form a resin layer on a thermoplastic resin-molded product (F).

Effects of the Invention

According to the present invention, the polymer (C) is excellent in dispersibility in water and thus has merits such that the dispersed particle sizes are fine, the particle size distribution can be made narrow, and it can be dispersed stably. Further, it can be dispersed by adding substantially no or a very small amount of a surfactant, and thus, there is a merit such that it is possible to suppress bleeding out of the surfactant which used to be problematic, and it is possible to obtain a coated product having an excellent appearance. Accordingly, the aqueous dispersion can be used also for an application where an organic solvent solution has been used for coating, such being advantageous also from the viewpoint of the safety and hygiene. Further, it is not an organic solvent solution, and it is thereby possible to reduce the discharge of VOC (volatile organic chemical substances), such being advantageous also from the environmental aspect. Yet, it is possible to obtain an aqueous dispersion having excellent characteristics containing substantially no chlorine. In a case where no chlorine is contained, there is no problem such as dioxin, toxicity or the like, such being very advantageous from the environmental viewpoint.

Further, as compared with a propylene homopolymer having a stereoregularity of the same level, the propylene/α-olefin copolymer (A) has high solubility in a solvent, is excellent in dispersibility in water and has a low melting point, whereby there is a merit such that the resin dispersion employing it is capable of lowering the baking temperature after coating.

Further, according to the process for producing the resin dispersion of the present invention, it is possible to easily obtain an excellent aqueous resin dispersion wherein the dispersed particle sizes are fine, the particle size distribution is narrow, and the resin particles are stably dispersed.

Further, the coating film obtained by applying a coating material containing the resin dispersion of the present invention is excellent in the water resistance, moisture resistance, oil resistance (gasohol resistance) and chemical resistance. Therefore, it is suitable for use in a coating method of finishing by coating only once, e.g. using a solvent lacquer coating material.

And, the obtained coating film exhibits good adhesion to a polyolefin base material or a plastic base material containing e.g. a polyolefin and can be formed also on a hardly adhesive substrate such as an untreated polypropylene to which adhesion or coating is usually difficult.

Further, when the polymer (C) in the resin dispersion of the present invention is used in combination with another resin to form a composite resin dispersion, it is possible to improve the physical property values derived from such another resin, specifically to improve the strength, water resistance, weather resistance, abrasion resistance, solvent resistance, etc. of the coating film.

Accordingly, the resin dispersion of the present invention is very useful as a surface treating agent, adhesive, coating agent, coating material or the like, for an olefin polymer.

Further, the laminate of the present invention is excellent in the coating film adhesion and is widely applicable to industrial products.

In the present invention, it is not required to provide all of the effects, and it is acceptable that at least one of the above-mentioned effects is obtainable.

BEST MODE FOR CARRYING OUT THE INVENTION

The aqueous resin dispersion (hereinafter sometimes referred to as "water dispersion", "aqueous dispersion" or "resin dispersion") of the present invention is made to have, dispersed in water with a 50% particle diameter of at most 0.5 μm, a polymer (C) having a hydrophilic polymer (B) or an acidic group bonded to a copolymer (A) which is a copolymer of propylene with an α-olefin other than propylene and which has a propylene content of at least 50 mol % and less than 100 mol % and has a weight average molecular weight Mw of at least 10,000 and a molecular weight distribution Mw/Mn of at most 3.5, wherein the surfactant content is at most 15 parts by weight per 100 parts by weight of the polymer (C). Namely, the polymer (C) having a hydrophilic polymer or an acidic group bonded to the above-mentioned specific olefin copolymer (A) is excellent in the dispersibility in water, whereby it is possible to obtain an aqueous resin dispersion wherein the dispersed particle diameters are fine, the particle size distribution is narrow, and the particles are stably dispersed, by using no or a very small amount of a surfactant.

In the present invention, dispersion is a concept including a state wherein dispersed particles are extremely small and dispersed in a monomolecular fashion, i.e. a state which may be substantially called a solution.

Now, the present invention will be described in more detail.

[1] Propylene/α-Olefin Copolymer (A)

The propylene/α-olefin copolymer (A) (hereinafter sometimes referred to also as "the copolymer (A)") in the present invention is a copolymer of propylene with an α-olefin other than propylene (hereinafter referred to simply as "the propylene/α-olefin copolymer"), which has a propylene content of at least 50 mol % and less than 100 mol % and has a weight average molecular weight Mw of at least 10,000 and a molecular weight distribution Mw/Mn of at most 3.5.

The copolymer (A) is not particularly limited so long as it is a copolymer of propylene with one or more α-olefin comonomers other than propylene, and various known copolymers may be employed. As such an α-olefin comonomer, ethylene, 1-butene, 1-pentene, 1-hexene, 1-heptene, 1-octene, cyclopentene, cyclohexene or norbornene may, for example, be mentioned. As the α-olefin comonomer, an α-olefin comonomer having from 2 to 6 carbon atoms is preferred, ethylene or 1-butene (hereinafter sometimes referred to simply as "butene") is more preferred, and particularly preferred is 1-butene. So long as the effects of the present invention are not substantially impaired, other monomers other than the α-olefin may further be copolymerized. Further, a chlorinated propylene polymer obtained by chlorination of such a propylene polymer may also be used.

Specifically, the copolymer (A) may, for example, be a propylene/ethylene copolymer, a propylene/butene copolymer, a propylene/hexene copolymer, a propylene/ethylene/butene copolymer, a chlorinated propylene/ethylene copolymer or a chlorinated propylene/butene copolymer. Among them, a propylene/ethylene copolymer, a propylene/butene copolymer, a chlorinated propylene/ethylene copolymer or a chlorinated propylene/butene copolymer is preferred; a propylene/ethylene copolymer or a propylene/butene copolymer is more preferred; and a propylene/butene copolymer is further preferred.

Commercially available ones may, for example, be WINTEC series (manufactured by Japan Polypropylene Corporation), TAFMER XM series (manufactured by Mitsui Chemicals Inc.), LICOCENE PP series (manufactured by Clariant International Ltd.), some of Superchlon series (manufactured by Nippon Paper Chemicals Co., Ltd.) and some of HARDLEN series (manufactured by Toyo Kasei Kogyo Co., Ltd.).

The propylene content in the copolymer (A) may vary depending upon the mutual relations of e.g. the type of the α-olefin comonomer, the stereoregularity, the chlorination degree, etc., but it is roughly as follows.

In the present invention, the content of propylene in the propylene/α-olefin copolymer (A) is at least 50 mol %. Usually, the higher the propylene content, the higher the adhesion of the polypropylene to the substrate. The propylene content is preferably at least 60 mol %, more preferably at least 70 mol %. However, the propylene content is less than 100%. Usually, if the propylene content is made low, it is possible to lower the melting point of the copolymer, whereby for example, there is a merit that the baking temperature after the coating can be lowered.

Particularly, a propylene/butene copolymer is preferred which has a propylene content of at least 70 mol % and less than 100 mol % and a 1-butene content of at most 30 mol %.

The copolymer (A) may be a random copolymer or a block copolymer, but a random copolymer is preferred. When it is a random copolymer, it is possible to more effectively lower the melting point of the copolymer. Further, the copolymer (A) may be linear or branched.

In a case where a chlorinated propylene/α-olefin copolymer is employed, the chlorination degree is usually at most 25 wt %, preferably at most 20 wt %, more preferably at most 10 wt %. As the chlorination degree increases, the polarity of the polymer tends to be high, and the affinity with the polyolefin tends to be low, and the adhesion tends to be low. Accordingly, the lower the chlorination degree, the better. Further, for the purpose of reducing the environmental load, it is preferred that the copolymer (A) contains substantially no chlorine. "Contains substantially no chlorine" means, for example, that the chlorination degree is less than 5 wt %.

With respect to the stereoregularity of the propylene/α-olefin copolymer, preferred is one partially or entirely has an isotactic structure. For example, a usual isotactic propylene/α-olefin copolymer may of course be used, and in addition, it is possible to use a copolymer having an α-olefin comonomer copolymerized to e.g. an isotactic block polypropylene or a stereo-block polypropylene, as disclosed in JP-A-2003-231714 or U.S. Pat. No. 4,522,982.

The copolymer (A) has a weight average molecular weight Mw of at least 10,000 as measured by GPC (Gel Permeation Chromatography) and calculated by a calibration curve of each polyolefin. If Mw is less than 10,000, the stickiness tends to be large, and the adhesion to a substrate tends to be inadequate. The lower limit value of Mw is more preferably 15,000, further preferably 30,000, particularly preferably 50,000. As Mw becomes higher than the lower limit value, the degree of stickiness tends to be small, and the oil resistance (gasohol resistance) or chemical resistance tends to be high, such being more useful as a coating material.

The weight average molecular weight Mw is preferably at most 500,000. The upper limit of Mw is more preferably 300,000, further preferably 250,000, particularly preferably 200,000. As Mw becomes lower than the upper limit, the viscosity tends to be low, and preparation of the resin dispersion tends to be easy. The GPC measurement can be carried out by a conventional method by using a commercially available apparatus by using e.g. o-dichlorobenzene as a solvent.

The copolymer (A) in the present invention has a molecular weight distribution Mw/Mn of at most 3.5, which is represented by the ratio of the weight average molecular weight Mw to the number average molecular weight Mn. This means that the molecular weight distribution is narrow, and the molecular weight of the copolymer is uniform. By using such a copolymer (A), there will be such merits that control of the particle size at the time of its dispersion in water will be easy, and it is possible to obtain a resin dispersion wherein the dispersed particle sizes are small, the particle size distribution is narrow and the particles are stably dispersed. Mw/Mn is preferably at most 3.0, and usually at least 1.0.

The copolymer (A) preferably has a melting point Tm of at most 100° C., more preferably at most 90° C. As the melting point Tm is lower than 100° C., the crystallinity tends to be low, and the solubility in a solvent will be improved, whereby emulsification or dispersion operation tends to be easily carried out at a low temperature, such being desirable. Further, in a case where such a resin dispersion is used, for example, in an application as a coating material or adhesive, it is advantageous also from such a viewpoint that it will melt at a low baking temperature. However, the melting point Tm of the copolymer (A) is usually at least 25° C., preferably at least 35° C., such being advantageous from the viewpoint of the high heat resistance, high hardness and free from stickiness of the layer obtained from the resin dispersion of the present invention.

Further, the copolymer (A) preferably has a heat of crystal fusion ΔH of at most 60 J/g, more preferably at most 50 J/g. As ΔH is lower than 60 J/g, the crystallinity tends to be low, and the solubility in a solvent will be improved, whereby emulsification or dispersion operation tends to be easily carried out at a low temperature, such being desirable. ΔH is usually at least 0 J/g, preferably at least 10 J/g from the viewpoint of the adhesive property. When it is at least 10 J/g, there is a merit in that cohesion failure tends to hardly occur. ΔH is more preferably at least 20 J/g, further preferably at least 30 J/g.

Further, the copolymer (A) preferably elutes at least 95 wt % at a temperature of at most 60° C. in temperature rising elution fractionation (TREF). By the elution of at least 95 wt %, the emulsification property of the molecules will be improved, and at the time of emulsification, agglomerates tend to hardly precipitate. If agglomerates will precipitate, not only the yield will be poor, but also there will be a problem of clogging of a filter during the filtration. The component which elutes at a temperature of at most 20° C. is preferably at most 20 wt %, more preferably at most 10 wt %, further preferably at most 5 wt %. Further, the component which elutes at a temperature of at most 30° C. is preferably at most 20 wt %, more preferably at most 10 wt %. As the component which elutes at a temperature of at most 20° C. or at most 30° C. is smaller, the adhesion property at room temperature or under warm condition and the chemical resistance such as tallow resistance or gasohol resistance will be improved. Particularly preferred is that at least 97 wt % will elute.

As the solvent, o-dichlorobenzene is usually employed. The temperature rising elution fractionation is a method for fractionation by utilizing the difference in the dissolution temperature and is an analytical method effective for analyzing the structural non-uniformity relating to the crystallinity of the polyolefin, such as the comonomer concentration in the polymer.

In TREF, a sample dissolved in a solvent at a high temperature is firstly poured into a column filled with glass beads at the same temperature, then the polymer component is crystallized by cooling at a constant temperature, whereby the polymer is held in a form precipitated on the surface of the beads. Then, the temperature of the column is stepwise raised, whereby a polymer component having low crystallinity will elute and will reach and be detected by a detector. As the column temperature rises, a component having higher crystallinity will elute sequentially. In this manner, from the elution temperature and the elution amount, the distribution of the polymer composition or the like can be measured. Further, there is also a method for measurement by using cross fractionation chromatography (CFC) which is a combination of TREF and GPC.

One type of the copolymer (A) may be used alone, or two or more types may be used in combination.

Further, unless the effects of the present invention are not substantially impaired, the copolymer (A) may be used in combination with another polyolefin such as polypropylene homopolymer or polyethylene homopolymer. For such combined use, polypropylene is preferred. The polypropylene may be chlorinated. Particularly preferred is a polypropylene having partially or entirely an isotactic structure. For example, not only a usual isotactic polypropylene, but also isotactic block polypropylene or stereo-block polypropylene as disclosed in JP-A-2003-231714 or U.S. Pat. No. 4,522,982 may also be used. A stereo-block polypropylene having isotactic blocks and atactic blocks, is preferred. It is more preferred that [mmmm] pentad showing isotactic stereoregularity is present within a range of from 10% to 90%. The pentad is preferably at least 20%, more preferably at least 30%, further preferably at least 40%. Further, the pentad is preferably at most 80%, more preferably at most 70%, further preferably at most 60%, particularly preferably at most 55%. For the measurement of the pentad ratio, the method disclosed in JP-A-2003-2331714 may be used. As the pentad ratio is higher than the lower limit value, the degree of stickiness tends to be small, and as it is lower than the upper limit value, the crystallinity tends to be low, and preparation of the resin dispersion tends to be easy. In a case where another polyolefin is used in combination, it is preferred that at least 5 wt % in the total polyolefin is the copolymer (A), and more preferably at least 10 wt %, further preferably at least 15 wt %, is the copolymer (A).

In a case where two or more copolymers (A) are used in combination, with respect to the values of the propylene content, chlorination degree, molecular weight distribution, etc., weight average values of the values of individual polymers are taken.

The method for preparing the copolymer (A) of the present invention is not particularly limited and may be any method so long as it is capable of producing a polymer satisfying the requirements of the present invention. For example, radical polymerization, cationic polymerization, anionic polymerization or coordination polymerization may be mentioned, and each may be living polymerization.

In the case of coordination polymerization, a method for polymerization by a Ziegler Natta catalyst or a method for polymerization by a single site catalyst or a Kaminsky catalyst may, for example, be mentioned. As a preferred method, a production method by means of a single site catalyst may be mentioned. Namely, in general, with a single site catalyst, by designing the ligand, the reaction can easily be controlled precisely, whereby a polymer having a sharp molecular weight distribution or stereoregularity distribution can be obtained, and as compared with a polymer obtainable by a Ziegler Natta catalyst, the melting point of a polymer by a single site catalyst is low, and with a resin dispersion employing such a polymer, it is possible to lower the baking temperature after the coating. As the single site catalyst, a metallocene catalyst or a Brookhart type catalyst may, for example, be used. In the case of the metallocene catalyst, a preferred catalyst may be selected depending upon the stereoregularity of the polyolefin to be polymerized, such as $C_1$ symmetric type, $C_2$ symmetric type, $C_{2V}$ symmetric type or $C_S$ symmetric type. It is preferred to employ a $C_1$ symmetric type or $C_2$ symmetric type metallocene catalyst.

Further, the polymerization may be of any type such as solution polymerization, slurry polymerization, bulk polymerization or gas-phase polymerization. In the case of solution polymerization or slurry polymerization, the solvent may, for example, be an aromatic hydrocarbon such as toluene or xylene; an aliphatic hydrocarbon such as hexane, octane or decane; an alicyclic aliphatic hydrocarbon such as cyclohexane or methyl cyclohexane; a halogenated hydrocarbon such as methylene chloride, carbon tetrachloride or chlorobenzene; an ester such as methyl acetate, ethyl acetate, propyl acetate or butyl acetate; a ketone such as acetone, methyl ethyl ketone, methyl isobutyl ketone or cyclohexanone; an alcohol such as methanol, ethanol, n-propanol, isopropanol or n-butanol; an ether such as dibutyl ether or tetrahydrofuran; or a polar solvent such as dimethylformamide or dimethylsulfoxide. Among them, an aromatic hydrocarbon, an aliphatic hydrocarbon or an alicyclic hydrocarbon is preferred, and more preferred is toluene, xylene, hexane, heptane, cyclopentane or cyclohexane. These solvents may be used alone or in combination as a mixture of two or more of them.

[2] Polymer (C1) Having Acidic Group Bonded to Propylene/α-Olefin Copolymer (A)

In the present invention, the acidic group is meant for an electron-pair accepting group and is not particularly limited. However, a carboxylic acid group (—COOH), a sulfo group (—SO$_3$H), a sulfino group (—SO$_2$H) or a phosphono group (—PO$_2$H) may, for example, be mentioned. Among them, a carboxyl group is preferred. The carboxylic acid group may be in the form of a dicarboxylic anhydride group (—CO—O—OC—) before dispersed in water. The carboxylic acid group may, for example, be a (meth)acrylic acid group, a fumaric acid group, a maleic acid group or its anhydride group, an itaconic acid group or its anhydride group, or a crotonic acid group.

The bonded amount of the acidic group is preferably within a range of from 0.4 to 5 mmol per 1 g of the copolymer (A) i.e. from 0.4 to 5 mmol/g. The lower limit value is more preferably 0.6 mmol/g, further preferably 0.8 mmol/g. On the other hand, the upper limit value is more preferably 3 mmol/g, further preferably 1.6 mmol/g, still more preferably 1.2 mmol/g. As the bonded amount is higher than the lower limit value, the polarity of the polymer (C1) tends to increase, and the hydrophilicity will increase, whereby the dispersed particle diameter tends to be small, and as it is lower than the upper limit value, the adhesion to the crystalline polyolefin as the substrate tends to increase. Further, a dicarboxylic anhydride group is regarded as containing two carboxylic acid groups in one group, and one mol of a dicarboxylic anhydride group is accordingly counted as 2 mols of an acidic group.

With respect to the process for producing the polymer (C1), the same process as the process for producing a copolymer (A2) having a reactive group bonded to a propylene/α-olefin copolymer (A), which will be described hereinafter in [3-1], may be used.

[3] Polymer (C2) Having Hydrophilic Polymer (B) Bonded to Propylene/α-Olefin Copolymer (A)

The ratio of the copolymer (A) to the hydrophilic polymer (B) is preferably (A):(B)=100:1 to 100:500 (weight ratio). By adjusting (B) to be at least 1 part by weight per 100 parts by weight of (A), it is possible to increase the dispersibility in water of the polymer (C2) and to make the dispersed particle diameter to be small without bringing about agglomeration or separation. Further, by adjusting (B) to be at most 500 parts by weight per 100 parts by weight of (A), it is possible to increase the adhesion to the polyolefin substrate. Particularly preferably, (A):(B)=100:5 to 100:500 (weight ratio).

The method for producing the polymer (C2) having the hydrophilic polymer (B) bonded to the propylene/α-olefin copolymer (A), may usually be a method (R1) wherein a hydrophilic monomer is polymerized in the presence of the copolymer (A) to form the hydrophilic polymer (B) bonded to the copolymer (A), or a method (R2) wherein a preliminarily polymerized hydrophilic polymer (B) is bonded to the propylene/α-olefin copolymer (A). Either method may suitably be selected for use depending upon the types and combination of the propylene/α-olefin copolymer and the hydrophilic polymer, the desired properties of the polymer (C2), etc. Further, the hydrophilic polymer (B) may be directly bonded to the copolymer (A), or by using a polymer (A2) having a reactive group bonded to the copolymer (A), as described hereinafter, the hydrophilic polymer (B) may be bonded thereto.

[3-1] Copolymer (A2) Having a Reactive Group Bonded to Propylene/α-Olefin Copolymer (A)

As the propylene/α-olefin copolymer (A2) having reactive groups, it is possible to employ, for example, a copolymer (A2a) obtained by copolymerizing an unsaturated compound having no reactive group with an unsaturated compound having a reactive group at the time of polymerization, or a polymer (A2b) obtained by graft-polymerizing a radical polymerizable unsaturated compound having a reactive group to a propylene/α-olefin copolymer, or a polymer (A2c) obtained by converting a propylene/α-olefin copolymer having unsaturated terminal groups to one having groups of an element of Group 13 to 17.

The copolymer (A2a) is a copolymer which is obtainable by copolymerizing an unsaturated compound having no reactive group with an unsaturated compound having a reactive group and which has the unsaturated compound having the reactive group inserted to the main chain. For example, it is obtainable by copolymerizing an α-olefin such as ethylene, propylene or butene with an α,β-unsaturated carboxylic acid or its anhydride such as an acrylic acid or maleic anhydride. Specifically, as the copolymer (A2a), a propylene-butene-maleic anhydride copolymer may, for example, be used. Such polymers may be used alone or in combination as a mixture of two or more of them. As the production method, a method described in [1] may be used in the same manner.

The polymer (A2b) is obtainable by graft-polymerizing a radical polymerizable unsaturated compound having a reactive group to a preliminarily polymerized propylene/α-olefin copolymer, wherein the unsaturated compound having a reactive group is grafted to the main chain. It is for example a polymer obtained by grafting (meth)acrylic acid, fumaric acid, maleic acid or its anhydride, itaconic acid or its anhydride, crotonic acid, 2-hydroxyethyl(meth)acrylate, 2-hydroxypropyl(meth)acrylate, (meth)acrylamide, (dimethylamino)ethyl(meth)acrylate, glycidyl(meth)acrylate, or (2-isocyanate)ethyl(meth)acrylate, to a polyolefin such as a polyethylene or a polypropylene. Such polymers may be used alone or in combination as a mixture of two or more of them. Here, (meth)acrylic acid is a general term for acrylic acid and methacrylic acid, and such applies to other similar cases.

As the propylene/α-olefin copolymer for this graft polymerization to obtain the polymer (A2b), the above-mentioned copolymer (A) may be used.

Specifically, the polymer (A2b) may, for example, be a maleic anhydride-modified polypropylene or its chlorinated product, a maleic anhydride-modified propylene/ethylene copolymer or its chlorinated product, a maleic anhydride-modified propylene/butene copolymer, an acrylic acid-modified propylene/ethylene copolymer or its chlorinated product, or an acrylic acid-modified propylene/butene copolymer or its chlorinated product. These polymers may be used alone or in combination as a mixture of two or more of them.

The radical polymerization initiator to be used for the graft polymerization may be suitably selected for use from usual radical polymerization initiators, and for example, an organic peroxide or azonitrile may be mentioned. As the organic peroxide, a peroxyketal such as di(t-butylperoxy)cyclohexane, a hydroperoxide such as cumene hydroperoxide, a dialkyl peroxide such as di(t-butyl)peroxide, a diacyl peroxide such as benzoyl peroxide, or a peroxyester such as t-butyl peroxy isopropyl monocarbonate may be used. The azonitrile may, for example, be azobisbutyronitrile or azobisisopropylnitrile. Among them, benzoyl peroxide or t-butyl peroxy isopropyl monocarbonate is particularly preferred. These initiators may be used alone or in combination as a mixture of two or more of them.

The ratio of the radical polymerization initiator to the graft copolymer units to be used is usually within a range of radical polymerization initiator:graft copolymer units=1:100 to 2:1 (molar ratio), preferably within a range of 1:20 to 1:1.

The reaction temperature is usually at least 50° C., preferably within a range of from 80 to 200° C. The reaction time is usually from about 2 to 20 hours.

The process for producing the polymer (A2b) is not particularly limited and may be any method so long as it is capable of producing a polymer satisfying the requirements of the present invention. For example, a method of heating and stirring in a solution for the reaction, a method of melting, heating and stirring in the absence of a solvent, or a method of heating and kneading by an extruder for the reaction, may be mentioned. As the solvent in the case of production in the solution, the solvent mentioned in [1] may be used in the same manner.

These methods may be used alone or in a combination of two or more of them. For example, after melt modification, modification may be further carried out in a solution.

Among them, melt modification is preferred, since the molecular weight may be reduced to a low molecular weight, and in a case where a high molecular weight propylene/α-olefin is used, the molecular weight may be lowered, so that emulsification may be facilitated.

As the polymer (A2c), it is possible to employ, for example, a propylene/α-olefin copolymer (A2c1) obtained by converting a double bond portion of a propylene/α-olefin copolymer having a terminal double bond to a Group 13 element group such as a boron group or an aluminum group, as disclosed in JP-A-2001-288372, a propylene/α-olefin copolymer (A2c2) obtained by converting a double bond portion of a propylene/α-olefin copolymer having a terminal double bond to a halogen element, as disclosed in JP-A-2005-048172, or a propylene/α-olefin copolymer (A2c3) obtained by converting a double bond portion of a propylene polymer having a terminal double bond to a mercapto group, as disclosed in JP-A-2001-98140.

The method for producing a propylene/α-olefin copolymer having a double bond may, for example, be a method of inducing α-hydrogen elimination during the olefin polymerization, or a method of thermally decomposing a propylene polymer at a high temperature.

The method for converting the double bond portion to a boron group or an aluminum group may, for example, be a method of reacting an organic boron compound or an organic aluminum compound to the double bond in a solvent.

The method for converting the double bond portion to a halogen element may, for example, be a method wherein the above-mentioned propylene/α-olefin copolymer (A2c1) having an organic boron group is reacted with a base and an aqueous hydrogen peroxide solution to convert it to a propylene polymer having a hydroxyl group, which is then reacted with a halogen group-containing acid halide to convert it to a halogen group-containing ester group.

The method for converting the double bond portion to a mercapto group may, for example, be a method of reacting thioacetic acid to a propylene polymer having terminal double bonds in the presence of a radical initiator, followed by treatment with a base.

The method for producing the polymer (A2c) is not particularly limited and may be any method so long as it is capable of producing a polymer satisfying the requirements of the present invention. However, a method of heating and stirring in a solution for the reaction is preferably employed. As the solvent in the case of production in the solution, the solvent mentioned in [1] may be used in the same manner.

With respect to the copolymer (A2a), the measurements of the propylene content and the molecular weight distribution Mw/Mn are carried out by regarding the copolymer (A2a) as the copolymer (A).

With respect to the copolymer (A2b), the measurements of the propylene content and the molecular weight distribution Mw/Mn are carried out against the copolymer (A) before graft polymerizing the radical-polymerizable unsaturated compound having a reactive group.

With respect to the copolymer (A2c), the measurements of the propylene content and the molecular weight distribution Mw/Mn are carried out against the copolymer (A) before converting the terminal double bond.

The content of reactive groups in the copolymer (A2a) or (A2b) having reactive groups bonded thereto, is preferably within a range of from 0.01 to 5 mmol per 1 g of the polyolefin i.e. from 0.01 to 5 mol/g. The lower limit value is more preferably 0.05 mmol/g, further preferably 0.1 mmol/g, particularly preferably 0.15 mmol/g. The upper limit value is more preferably 1 mmol/g, further preferably 0.8 mmol/g, particularly preferably 0.5 mmol/g.

The content of reactive groups in the copolymer (A2c) having reactive groups bonded thereto is usually at most one reactive group per one molecule of the polymer i.e. at most 1/number average molecular weight Mn (mol/g), in view of its production method, and it tends to be low as compared with the copolymer (A2a) and (A2b). Accordingly, the content of reactive groups is preferably within a range of from 0.004 to 2 mmol/g per 1 g of the polyolefin. The lower limit value is more preferably 0.005 mmol/g. On the other hand, the upper limit value is more preferably 0.2 mmol/g.

As the content is higher than the lower limit value, the amount of the hydrophilic polymer (B) bonded increases, and the hydrophilicity of the polymer (C) increases, whereby the dispersed particle sizes tend to be small. As it is lower than the upper limit value, the adhesion to a crystalline polyolefin as the substrate tends to increase. Here, a dicarboxylic anhydride group may be regarded as containing two carboxylic acid groups in the group, and 1 mol of a dicarboxylic anhydride is counted to be 2 mols of the reactive group.

Further, the copolymer (A2) may be linear or branched. The copolymer (A2) may be used alone or in combination as a mixture of two or more of them.

In the present invention, both of the copolymer (A) itself and the copolymer (A2) having reactive groups bonded may suitably by used depending upon the combination with the hydrophilic polymer (B) or the desired properties of the polymer (C). However, it is preferred to contain at least the copolymer (A2) having reactive groups, in view of merits such that the amount of the hydrophilic polymer (B) to be bonded can easily be controlled, and various reactions may be employed for such bonding. Only the copolymer (A2) having reactive groups may be used.

The reactive groups may, for example, be carboxylic acid groups, dicarboxylic anhydride groups, dicarboxylic anhydride monoester groups, hydroxyl groups, amino groups, epoxy groups, isocyanate groups, mercapto groups or halogen groups. More preferred is at least one member selected from the group consisting of carboxylic acid groups, dicarboxylic anhydride groups and dicarboxylic anhydride monoester groups. These carboxylic acid groups, etc. are highly reactive and can easily be bonded to a hydrophilic polymer. Not only that, there are many unsaturated compounds having such groups, which may easily be copolymerized or graft-polymerized to a polyolefin.

Further, any one of the polymers (A2a), (A2b) and (A2c) may be used, but preferred is usually the polymer (A2b). The polymer (A2b) has such a merit that the amount of the hydrophilic polymer (B) to be bonded can easily be controlled.

[3-2] Hydrophilic Polymer (B)

In the following, the description will be made only with respect to the copolymer (A) for the sake of simplicity of description, but the same applies also to the copolymer (A2).

In the present invention, the hydrophilic polymer is such a polymer that when it is dissolved in water at 25° C. at a concentration of 10 wt %, the insoluble content is at most 1 wt %. As the hydrophilic polymer (B), any polymer may be used without any particular restriction so long as the effects of the present invention are not substantially impaired, and any of a synthetic polymer, a semi-synthetic polymer and a natural polymer may be employed. It may have reactive groups.

The synthetic polymer is not particularly limited, and for example, a poly(meth)acrylic resin, a polyether resin, a polyvinyl alcohol resin or a polyvinyl pyrrolidone resin may, for example, be used. The natural polymer is not particularly limited, and for example, a starch such as corn starch, wheat starch, sweet potato starch, potato starch, tapioca starch or rice starch, a seaweed such as dried layer, agar or sodium alginate, a plant mucilage such as gum Arabic, tragacauth gum or konjac, an animal protein such as hide glue, casein or gelatin, or a fermented mucilage such as pullulan or dextrin may, for example, be used. The semisynthetic polymer is not particularly limited, and for example, a starch such as carboxyl starch, cation starch or dextrin, or a cellulose such as viscose, methyl cellulose, ethyl cellulose, carboxylmethyl cellulose or hydroxyethyl cellulose may, for example, be used.

Among them, preferred is a synthetic polymer whereby the degree of hydrophilicity can easily be controlled, and the properties are stabilized. More preferred is an acrylic resin such as a poly(meth)acrylic resin, a polyvinyl alcohol resin, a polyvinyl pyrrolidone resin or a polyether resin. They may be used alone or in combination as a mixture of two or more of them. A highly hydrophilic polyether resin is most preferred.

The acrylic resin to be used as the hydrophilic polymer (B) in the present invention is usually obtained by polymerizing an unsaturated carboxylic acid or its ester or anhydride by radical polymerization, anionic polymerization or cationic polymerization. The method for bonding it with the copolymer (A) is not particularly limited, and for example, a method of carrying out radical polymerization in the presence of a propylene/α-olefin copolymer, or a method of reacting an acrylic resin having a reactive group such as a hydroxyl group, an amino group, a glycidyl group or a carboxylic (anhydride) group with a propylene/α-olefin copolymer having a reactive group, may, for example, be mentioned.

The hydrophilic unsaturated carboxylic acid or its ester or anhydride may preferably be (meth)acrylic acid, hydroxylethyl(meth)acrylate, dimethylaminoethyl(meth)acrylate, a quaternary product of dimethylaminoethyl(meth)acrylate or (meth)acrylamide.

Further, within a range wherein hydrophilicity is shown, a hydrophobic radical polymerizable compound may be copolymerized to the polymer (C). A copolymerizable hydrophobic monomer may, for example, be a (meth)acrylic acid ester monomer having a $C_{1-12}$ alkyl, aryl or arylalkyl group, or a polymerizable vinyl monomer having a $C_{1-12}$ hydrocarbon group.

The (meth)acrylic acid ester monomer having a $C_{1-12}$ alkyl group may, for example, be methyl(meth)acrylate, ethyl(meth)acrylate, n-propyl(meth)acrylate, isopropyl(meth)acrylate, n-butyl(meth)acrylate, isobutyl(meth)acrylate, t-butyl(meth)acrylate, hexyl(meth)acrylate, cyclohexyl(meth)acrylate, octyl(meth)acrylate, 2-ethylhexyl(meth)acrylate, nonyl(meth)acrylate, decyl(meth)acrylate or dodecyl(meth)acrylate.

The (meth)acrylic acid ester monomer having a $C_{1-12}$ aryl or arylalkyl group may, for example, be phenyl(meth)acrylate, toluoyl(meth)acrylate or benzyl(meth)acrylate.

The polymerizable vinyl monomer having a $C_{1-12}$ hydrocarbon group may, for example, be vinyl acetate or a styrene monomer.

Preferred may, for example, be a (meth)acrylic acid ester such as methyl(meth)acrylate or butyl(meth)acrylate, or vinyl acetate.

Otherwise, a radical polymerizable unsaturated compound may be polymerized in the presence of a radical polymerization initiator to form a polymer and at the same time to bond it to the copolymer (A), followed by modifying it to the hydrophilic polymer (B). For example, a method wherein t-butyl(meth)acrylate is polymerized and then hydrolyzed under an acidic condition to convert it to a poly(meth)acrylic acid, or a method wherein vinyl acetate is polymerized and then saponified to modify it to a polyvinyl alcohol, may be mentioned. The copolymerizable hydrophobic monomer may be a (meth)acrylate such as methyl(meth)acrylate or butyl(meth)acrylate, or vinyl acetate. In such a case, as the copolymer (A), a copolymer (A2) having reactive groups bonded thereto may be used, but usually, a copolymer (A) having no reactive group is employed.

The polyvinyl alcohol resin to be used as the hydrophilic polymer (B) in the present invention is obtained usually by polymerizing vinyl acetate to obtain a polyvinyl acetate, followed by saponification. The saponification degree may be complete saponification or partial saponification.

The polyvinyl pyrrolidone resin to be used as the hydrophilic polymer (B) in the present invention is obtained usually by polymerizing vinyl pyrrolidone.

The polyether resin to be used as the hydrophilic polymer (B) in the present invention is obtained usually by subjecting a cyclic alkylene oxide or a cyclic alkylene imine to ring-opening polymerization. The method for bonding it to the copolymer (A) is not particularly limited, and for example, a method of subjecting a cyclic alkylene oxide to ring-opening polymerization in the propylene/α-olefin copolymer having reactive groups, or a method of reacting a hydrophilic polymer having reactive groups such as a polyether polyol or a polyether amine obtained by e.g. ring-opening polymerization, with the propylene/α-olefin copolymer having reactive groups, may, for example, be mentioned.

The polyether amine is a compound having a primary amino group as a reactive group at one terminal or both terminals of a resin having a polyether skeleton. The polyether polyol is a compound having a hydroxyl group as a reactive group at both terminals of a resin having a polyether skeleton.

The hydrophilic polyalkylene oxide or polyalkylene imine may preferably be polyethylene oxide, polypropylene oxide, or polyethylene imine.

Further, as the polyether amine, JEFFAMINE M series, D series or ED series, manufactured by Huntsman Corporation may, for example, be used.

Before bonding to the copolymer (A), the hydrophilic polymer (B) to be used in the present invention preferably has at least one reactive group which is reactive thereto. As such a reactive group, a carboxylic acid group, a dicarboxylic anhydride group, a dicarboxylic anhydride monoester group, a hydroxyl group, an amino group, an epoxy group or an isocyanate group may, for example, be mentioned. Preferably, it has at least an amino group. The amino group has a high reactivity with various reactive groups such as a carboxylic acid group, a carboxylic anhydride group, a glycidyl group and an isocyanate group, whereby it is easy to bond the hydrophilic polymer to the polyolefin. The amino group may be primary, secondary or tertiary, but more preferred is a primary amino group.

At least one reactive group may be present, but more preferably, it has only one reactive group. If it has two or more reactive groups, at the time of bonding it to the copolymer (A), it tends to form a three dimensional network structure and is likely to be gelled.

However, it may have a plurality of reactive groups, if a reactive group having a higher reactivity than others is only one. For example, a hydrophilic polymer having a plurality of hydroxyl groups and one amino group having a higher reactivity than the hydroxyl groups, is a preferred example. Here, the reactivity is a reactivity with the reactive group of the copolymer (A).

The hydrophilic polymer (B) in the present invention is required to have a high molecular weight in order to impart sufficient hydrophilicity to the polymer (C), and it is one having a weight average molecular weight Mw of at least 200, as measured by GPC and calculated by a calibration curve of polystyrene. Mw is preferably at least 300, more preferably at least 500. However, the weight average molecular weight Mw is preferably at most 200,000, more preferably 100,000, further preferably 10,000. As Mw is higher than the lower limit value, the hydrophilicity of the polymer (C) tends to increase, and the dispersed particle sizes tend to be small so that the dispersion tends to be stabilized, and as it is lower than the upper limit value, the viscosity tends to be low, and the preparation of the resin dispersion tends to be easy. Here, the GPC measurement is carried out by a conventional method using a commercial available apparatus and by using e.g. THF as a solvent.

Further, in a case where the hydrophilic polymer (B) is insoluble in THF, it may be dissolved in a solvent such as water, methanol, ethanol, acetonitrile, dimethylformamide, acetone, chloroform or dimethylsulfoxide, and by using a column suitable for the polarity of such a solvent, GPC may be measured by the same solvent. Further, by adding an ionic substance such as sodium nitrate, it is possible to measure particularly an ionic substance excellently. Further, a calibration curve prepared by a standard substance suitable for the polarity of the solvent, may be employed, and for example, polyethylene oxide is suitably employed.

The amount of the hydrophilic polymer (B) bonded to the copolymer (A) is preferably from 0.01 to 5 mmol per 1 g of the copolymer (A), i.e. from 0.01 to 5 mmol/g. The lower limit value is more preferably 0.05 mmol/g, further preferably 0.1 mmol/g, particularly preferably 0.15 mmol/g. On the other hand, the upper limit value is more preferably 1 mmol/g, further preferably 0.8 mmol/g, particularly preferably 0.5 mmol/g, most preferably 0.3 mmol/g.

The amount of the hydrophilic polymer (B) is calculated by 1/number average molecular weight Mn (mol/g). As the amount is higher than the lower limit value, the hydrophilicity of the polymer (C) tends to increase, and the dispersed particle sizes tend to be small so that the dispersion tends to be stabilized, and as it is lower than the upper limit value, the adhesion to a crystalline polyolefin as a substrate tends to increase.

The copolymer (A) and the hydrophilic polymer (B) may form a graft copolymer having the hydrophilic polymer (B) graft-bonded to the copolymer (A), or a block copolymer of the copolymer (A) and the hydrophilic polymer (B) including such a state that the hydrophilic polymer (B) is bonded to one end or both ends of the copolymer (A). However, preferred is a graft copolymer in view of such merits that the content of the hydrophilic polymer (B) is easy to control, and as compared with a block copolymer, the content of the hydrophilic polymer (B) can easily be increased.

The hydrophilic polymer (B) may be bonded to the copolymer (A) by various reaction modes. The reaction mode is not particularly limited, but it is, for example, a radical graft reaction or a reaction utilizing reactive groups.

By the radical graft reaction, a bond by a carbon-carbon covalent bond will be formed.

The reaction utilizing reactive groups is one wherein both of the copolymer (A) and the hydrophilic polymer (B) have reactive groups, and they are bonded by reacting the reactive groups, whereby a covalent bond or an ionic bond will be formed. Such a reaction may, for example, be an esterification reaction of a carboxylic group with a hydroxyl group, a ring-opening reaction of an epoxy group with a carboxylic acid group, ring-opening reaction of an epoxy group with a primary or secondary amino group, an amidation reaction of a carboxylic group with a primary or secondary amino group, a quaternary ammonium-forming reaction of a carboxylic acid group with a tertiary amino group, a urethane reaction of a carboxylic acid group with an isocyanate group, or a urethane reaction of a primary or secondary amino group with an isocyanate group. The reaction rate in each reaction may optionally be selected within a range of from 1 to 1000, preferably from 50 to 1000, more preferably from 70 to 1000.

Here, the carboxylic acid group includes a dibasic acid or its anhydride such as maleic acid or maleic anhydride. In such a case, 1 mol of the dibasic acid or its anhydride is calculated as two equivalents, and the group reactive thereto may be reacted one equivalent or two equivalents.

[3-3] Method for Producing Polymer (C2)

Usually, as a method for producing the polymer (C) having the hydrophilic polymer (B) bonded to the copolymer (A), there is a method (R1) wherein a hydrophilic radical polymerizable unsaturated compound is polymerized in the presence of the propylene/α-olefin copolymer to form the hydrophilic polymer (B) bonded to the propylene/α-olefin copolymer, or a method (R2) wherein a preliminarily polymerized hydrophilic polymer (B) is bonded to the propylene/α-olefin copolymer.

[3-3-1] Method (R1) for Producing Polymer (C2)

In this method, a hydrophilic radical polymerizable unsaturated compound (hydrophilic monomer) is polymerized in the presence of a propylene/α-olefin copolymer to obtain a hydrophilic polymer (B) bonded to the propylene/α-olefin copolymer. The method for polymerization of the hydrophilic radical polymerizable unsaturated compound may, for example, be addition polymerization, condensation polymerization or ring-opening polymerization. At that time, after the polymerization, a hydrophobic radical polymerizable unsaturated compound may be copolymerized within a range where a hydrophilic polymer can be formed. In any case, as the propylene/α-olefin copolymer, a copolymer (A) having no reactive group, or a copolymer (A2) having reactive groups bonded thereto, may be used.

Specifically, there is, for example, a method wherein a hydrophilic radical polymerizable unsaturated compound is graft-polymerized in the presence of the copolymer (A) and a radical-polymerization initiator such as a peroxide or azo compound to obtain a graft copolymer of the propylene/α-olefin copolymer and polyacryl. Further, as disclosed in JP-A-2001-288372, there is a method wherein a hydrophilic radical polymerizable unsaturated compound is polymerized in the presence of oxygen and a propylene/α-olefin copolymer (A2c1) having a Group 13 element group such as a boron group or an aluminum group at its terminal to obtain a block copolymer of the propylene/α-olefin copolymer and polyacryl. Further, as disclosed in JP-A-2004-131620 or JP-A-2005-048172, there is a method wherein a block copolymer of a propylene polymer and a polyacryl is prepared by an atom transfer living radical method by using a propylene/α-olefin copolymer (A2c2) having a halogen atom at its terminal and a copper halide, ruthenium halide or the like. Further, as disclosed in JP-A-2001-098140, there is a method wherein a radical initiator and a hydrophilic radical polymerizable unsaturated compound are polymerized in the presence of a propylene/α-olefin copolymer having a mercapto group at its terminal to obtain a block copolymer of the propylene/α-olefin copolymer and polyacryl.

The hydrophilic radical polymerizable unsaturated compound is not particularly limited, and for example, (meth) acrylic acid, hydroxyethyl(meth)acrylate, methoxypolyethylene glycol(meth)acrylate, dimethylaminoethyl(meth)

acrylate, quaternary dimethylaminoethyl(meth)acrylate or vinyl pyrrolidone may be mentioned.

A copolymerizable hydrophobic monomer may, for example, be a (meth)acrylic acid ester monomer having a $C_{1-12}$ alkyl, aryl or arylalkyl group, or a polymerizable vinyl monomer having a $C_{1-12}$ hydrocarbon group.

The (meth)acrylic acid ester monomer having a $C_{1-12}$ alkyl group may, for example, be methyl(meth)acrylate, ethyl(meth)acrylate, n-propyl(meth)acrylate, isopropyl (meth)acrylate, n-butyl(meth)acrylate, isobutyl(meth)acrylate, t-butyl(meth)acrylate, hexyl(meth)acrylate, cyclohexyl (meth)acrylate, octyl(meth)acrylate, 2-ethylhexyl(meth) acrylate, nonyl(meth)acrylate, decyl(meth)acrylate or dodecyl(meth)acrylate.

The (meth)acrylic acid ester monomer having a $C_{1-12}$ aryl or arylalkyl group may, for example, be phenyl(meth)acrylate, toluoyl(meth)acrylate or benzyl(meth)acrylate.

The polymerizable vinyl monomer having a $C_{1-12}$ hydrocarbon group may, for example, be vinyl acetate or a styrene monomer.

Preferred may, for example, be a (meth)acrylic acid ester such as methyl(meth)acrylate or butyl(meth)acrylate, or vinyl acetate.

A reactive surfactant or a reactive emulsifier may also be used as an aqueous radical polymerizable unsaturated compound. For example, an alkyl propenylphenol polyethylene oxide adduct, an alkyldipropenylphenol polyethylene oxide adduct and their sulfuric acid ester salts as disclosed in JP-A-04-053802 and JP-A-04-050204 may be mentioned. Among them, an alkylpropenylphenol ethylene oxide 20 mol adduct, 30 mol adduct or 50 mol adduct (Aqualon RN-20, RN-30 or RN-50, manufactured by Daiichi Kogyo Seiyaku Co., Ltd.), or a sulfuric acid ester ammonium salt of an alkylpropenylphenol polyethylene oxide 10 mol adduct, or a sulfuric acid ester ammonium salt of the same 20 mol adduct (Aqualon HS-10 or HS-20, manufactured by Daiichi Kogyo Seiyaku Co., Ltd.) is used preferably.

Otherwise, a radical polymerizable unsaturated compound may be polymerized in the presence of a radical polymerization initiator to form a polymer and at the same time to bond it to a copolymer (A), and then, modified to the hydrophilic polymer (B). For example, a method wherein t-butyl(meth)acrylate is polymerized and then hydrolyzed in the presence of an acid to modify it to a poly(meth)acrylic acid, or a method of further neutralizing it with a base, or a method wherein vinyl acetate is polymerized and then saponified to modify it to a polyvinyl alcohol, may be mentioned. As a copolymerizable hydrophobic radical polymerizable unsaturated compound, a (meth)acrylic acid ester such as methyl(meth)acrylate or butyl(meth)acrylate, or vinyl acetate may be mentioned. In such a case, as the propylene/α-olefin copolymer, a copolymer (A2) having reactive groups bonded thereto may be used, but usually, a copolymer (A) having no reactive group is employed.

Further, there is a method wherein a copolymer (A2) having reactive groups is employed, and using such reactive groups as initial terminals, a hydrophilic ring-opening polymerization monomer or the like is polymerized to obtain a hydrophilic polymer (B).

The hydrophilic ring-opening polymerization monomer may, for example, be ethylene oxide, propylene oxide or ethylene imine. The copolymerizable hydrophobic monomer may, for example, be trimethylene oxide, tetrahydrofuran, β-propiolactone, γ-butyrolactone or ε-caprolactone.

They may be used alone or in combination as a mixture of two or more of them.

The reaction method is not particularly limited so long as a polymer satisfying the requirements of the present invention can thereby be produced. For example, a method of heating and stirring in a solution for the reaction, a method of melting, heating and stirring in the absence of a solvent for the reaction, or a method of heating and kneading by an extruder for the reaction, may be mentioned. The reaction temperature is usually within a range of from 0 to 200° C., preferably within a range of from 30 to 150° C. As the solvent in the case of production in a solution, the solvent mentioned in [3-1] may be used in the same manner.

[3-3-2] Method (R2) for Producing Polymer (C2)

In this method, a preliminarily polymerized hydrophilic polymer (B) is bonded to the copolymer (A). In this case, as the hydrophilic polymer (B), one mentioned in [3-2] may be used.

Specifically, there is, for example, a method wherein firstly, at the time of polymerizing a hydrophilic monomer to form a hydrophilic polymer, an unsaturated double bond is retained in its molecule, and then it is graft-polymerized to the propylene/α-olefin copolymer by means of a radical polymerization initiator. In such a case, as the propylene/α-olefin copolymer, a copolymer (A2) having reactive groups may be used, but usually, a copolymer (A) having no reactive group is used.

Further, there is a method wherein firstly, a hydrophilic polymer having a reactive group at its terminal is formed by polymerization, and then this is bonded to a copolymer (A2) having reactive groups. The hydrophilic polymer having a reactive group at its terminal may be obtained by polymerizing a hydrophilic monomer by using a compound having a reactive group, as an initiator or a chain transfer agent. Or, it may be obtained by ring-opening polymerization of a hydrophilic ring-opening polymerization monomer such as an epoxy compound.

As the hydrophilic monomer which may be used in such a case, various hydrophilic monomers mentioned in [3-3-1] may be used in the same manner.

They may be used alone or in combination as a mixture of two or more of them.

The reaction method is not particularly limited and may be any method so long as a polymer satisfying the requirements of the present invention can thereby be produced. For example, a method of heating and stirring in a solution for the reaction, a method of melting, heating and stirring in the absence of a solvent for the reaction, or a method of heating and kneading by an extruder for the reaction, may be mentioned. The reaction temperature is usually within a range of from 0 to 200° C., preferably within a range of from 30 to 150° C. As the solvent in the case of production in a solution, the solvent mentioned in [3-1] may be used in the same manner.

[4] Method for Producing Aqueous Resin Dispersion of Polymer (C)

The method for producing a resin dispersion containing the polymer (C) of the present invention is not particularly limited, and for example, a method which comprises preparing a mixture of the polymer (C), water and a solvent other than water, and then, removing the solvent from the mixture to obtain an aqueous dispersion, or a method which comprises melting the polymer (C) at a temperature of at least the melting temperature of the polymer (C), and then, adding water thereto to obtain a dispersion, may be mentioned. Preferred is the former. By the former method, a resin dispersion with fine particle sizes can easily be prepared.

At the time of preparing the mixture, heating may be applied as the case requires. The temperature is usually from 30 to 150° C. The proportion of the solvent other than water in the resin dispersion is made to be usually at most 50%, finally. It is preferably at most 200, more preferably at most 10%, particularly preferably at most More preferred is a method wherein the solvent other than water is added to the polymer (C), and after dissolving it, if necessary, by heating, water is added, whereby an aqueous dispersion with finner particle sizes can easily be prepared. The temperature at the time of dissolving the polymer in the solvent or at the time of adding water, is usually from 30 to 150° C. In a case where the polymer is once dissolved in the solvent other than water, the solvent may be distilled off after the addition of water. The proportion of the solvent other than water in the resin dispersion is as described above.

Further, an aqueous dispersion having fine particle sizes can be prepared also by a method wherein water and a solvent other than water are added to a solution having the polymer (C) dissolved in a solvent, and if necessary, after heating for dissolution, the solvent is distilled off. The temperature at the time of adding water is usually from 30 to 150° C. The ratio of the solvent other than water in the resin dispersion is as mentioned above.

The solvent other than water to be used in this method may, for example, be an aromatic hydrocarbon such as toluene or xylene; an aliphatic hydrocarbon such as hexane, octane or decane; an alicyclic aliphatic hydrocarbon such as cyclohexane or methyl cyclohexane; a halogenated hydrocarbon such as methylene chloride, carbon tetrachloride or chlorobenzene; an ester such as methyl acetate, ethyl acetate, propyl acetate or butyl acetate; a ketone such as acetone, methyl ethyl ketone, methyl propyl ketone, methyl isobutyl ketone or cyclohexanone; an alcohol such as methanol, ethanol, n-propanol, isopropanol, n-butanol, 2-butanol, isobutanol, t-butanol, cyclohexanol, ethylene glycol, propylene glycol or butanediol; an ether such as dipropyl ether, dibutyl ether or tetrahydrofuran; an organic solvent having two or more functional groups, such as 2-methoxyethanol, 2-ethoxyethanol, 2-butoxyethanol, 2-methoxypropanol, 2-ethoxypropanol or diacetone alcohol; or a polar solvent such as dimethylformamide or dimethylsulfoxide. These solvents may be used alone or in combination as a mixture of two or more of them.

Among them, it is particularly preferred to use at least one solvent soluble in water in an amount of at least 1 wt %, and more preferred is one soluble in water in an amount of at least 5 wt %. For example, methyl ethyl ketone, methyl propyl ketone, cyclohexanone, n-propanol, isopropanol, n-butanol, 2-butanol, isobutanol, t-butanol, cyclohexanol, tetrahydrofuran, 2-methoxyethanol, 2-ethoxyethanol, 2-butoxyethanol, 2-methoxypropanol, 2-ethoxypropanol or diacetone alcohol is preferred.

An apparatus to produce the resin dispersion by adding water after bringing the polymer in a state melted or dissolved in a solvent, is not particularly limited, and for example, a reactor equipped with a stirrer, or a single screw or twin screw kneader may be used. The stirring speed at that time varies to some extent depending upon the choice of the apparatus, but it is usually within a range of from 10 to 1,000 rpm.

[5] Aqueous Resin Dispersion

The polymer (C) of the present invention is excellent in dispersibility in water, and according to the method for producing a resin dispersion of the present invention, an aqueous resin dispersion with fine dispersed particle sizes can be obtained. Therefore, the aqueous resin dispersion of the present invention has merits such that the dispersed particle sizes are fine, and the resin is dispersed stably. Accordingly, when it is used, a coated product having an excellent appearance can be obtained.

The 50% particle diameter of the polymer (resin) in the resin dispersion of the present invention is at most 0.5 µm. The 50% particle diameter is preferably at most 0.3 µm, more preferably at most 0.2 µm, further preferably at most 0.1 µm. Whereas, the 90% particle diameter is preferably at most 1 µm, particularly preferably at most 0.5 µm. By adjusting the dispersed particle diameter to be small, it is possible to improve the dispersion stability, whereby agglomeration tends to hardly take place, and the particles can be dispersed more stably. Further, the ratio of the 90% particle diameter to the 50% particle diameter being small means that the particle size distribution is narrow, and consequently, the dispersion stability is improved.

Here, the "50% particle diameter" is a particle diameter at 50% on cumulative basis from the finest particle diameter as calculated by volume, which is referred to also as the 50% average particle diameter. Likewise, a particle diameter at 90% on cumulative basis is the 90% particle diameter.

In the present invention, the dispersion is a concept including a state wherein dispersed particles are very small and dispersed in a unimolecular state, i.e. a state which can be said to be substantially dissolution. Accordingly, there is no particular limit with respect to the lower limit value for the dispersed particle size.

In the resin dispersion of the present invention, the solid content is preferably at least 5 wt %, more preferably at least 10 wt %, further preferably at least 20 wt %, based on the entirety. And, it is preferably at most 70 wt %, more preferably at most 60 wt %, further preferably at most 50 wt %, particularly preferably at most 40 wt %. The smaller the amount of the solid content, the lower the viscosity, whereby the dispersion can be applied to various coating methods and is easy to use, and the stability as a dispersion tends to be high. However, for example, when it is used as a primer or an adhesive, the solid content is preferably high in order to save the energy and time for drying water after the coating.

Further, the resin dispersion of the present invention has a surfactant content of at most 15 parts by weight per 100 parts by weight of the polymer (C). Namely, the dispersed particle sizes of the resin are very small, and the resin dispersion contains substantially no or a very small amount of a surfactant. When used as a coating material, such a resin dispersion has a merit in that a coated product having an excellent appearance can be obtained, while bleeding out can be prevented, and thus, such a resin dispersion may be used as a coating material for the outermost surface of the coating. Further, the water resistance or oil resistance (gasohol resistance) of the coating can be improved, and the obtainable resin dispersion will be excellent in each of the adhesion, water resistance, moisture resistance, oil resistance (gasohol resistance) and chemical resistance.

The amount of the surfactant should better be small, and the surfactant content of the resin dispersion is preferably at most 10 parts by weight per 100 parts by weight of the polymer (C). It is more preferably at most 5 parts by weight, further preferably at most 2 parts by weight. The resin dispersion may contain substantially no surfactant. "Contains substantially no surfactant" means "less than 1 part by weight per 100 parts by weight of the polymer (C)". Most preferably, it contains no surfactant.

As the surfactant, a cationic surfactant, an anionic surfactant, a nonionic surfactant, an amphoteric surfactant or a reactive surfactant may, for example, be used. As a surfactant, one having, as a hydrophobic group, an alkyl, alkenyl, alkylaryl or alkenylaryl group having at least 4 carbon atoms, is usually employed. The carbon number is preferably at least 8, more preferably at least 12. However, the carbon number is usually at most 30.

The nonionic surfactant may, for example, be polyoxyethylene cetyl ether, polyoxyethylene stearyl ether, polyoxyethylene nonyl phenyl ether or polyoxyethylene sorbitan monolaurate. The anionic surfactant may, for example, be sodium dodecylbenzenesulfonate, sodium sulfosuccinate, sodium lauryl sulfate, or sodium polyoxyethylene lauryl sulfate. The cationic surfactant may, for example, be stearyl trimethylammonium chloride, or cetyl trimethylammonium bromide. The amphoteric surfactant may, for example, be lauryl dimethylamino succinic acid betaine.

Further, as the above surfactant, a so-called reactive surfactant having a radical polymerization functional group may, for example, be used. When such a reactive surfactant is used, the water resistance of the coating film formed by using such a resin dispersion can be improved. A typical commercially available reactive surfactant may, for example, be Eleminol JS-2 (manufactured by Sanyo Chemical Industries, Ltd.) or Latemul S-180 (manufactured by Kao Corporation).

A nonionic surfactant tends to hardly deteriorate the water resistance as compared with other surfactants, and accordingly, a nonionic surfactant may be contained in a relatively large amount. For example, in a case where surfactants other than a nonionic surfactant should be at most 5 parts by weight per 100 parts by weight of the polymer (C), the nonionic surfactant may be at most 10 parts by weight.

Further, according to the present invention, it is not necessarily required to use a chlorinated polyolefin, whereby the environmental load can be reduced.

To the resin dispersion of the present invention, an acidic substance or a basic substance may be added as the case requires. As the acidic substance, an inorganic acid such as hydrochloric acid or sulfuric acid, or an organic acid such as acetic acid, may, for example, be mentioned. As the basic substance, an inorganic base such as sodium hydroxide or potassium hydroxide, or triethylamine, diethylamine, diethylethanolamine, 2-methyl-2-amino-propanol or morpholine, may, for example, be mentioned. Otherwise, a polymer compound containing acidic groups or basic groups, may be used.

To the resin dispersion of the present invention, various additives may be incorporated as the case requires within a range not to substantially impair the effects of the present invention. For example, various stabilizers such as an ultraviolet absorber, an antioxidant, a weather resistant stabilizer or a heat resistant agent; colorants such as titanium oxide and an organic pigment; electroconductivity-imparting agents such as carbon black and ferrite; and various additives such as pigment, a dye, a pigment dispersant, a leveling agent, a defoaming agent, a thickener, an antiseptic, a mildewcide, an anti-corrosion agent, a wetting agent and a drying-preventive agent may be incorporated.

The defoaming agent may, for example, be SURFYNOL 104PA or SURFYNOL 440 manufactured by Air Products.

The drying-preventive agent may, for example, be Byketol-PC manufactured by Big Chemie or the above-mentioned surfactants.

In order to further improve various coating film properties such as water resistance and solvent resistance, a crosslinking agent may be added in an amount of from 0.01 to 100 parts by weight per 100 parts by weight of the resin in the dispersion. As such a crosslinking agent, a self-crosslinkable crosslinking agent, a compound having a plurality of functional groups reactive with carboxyl groups in its molecule, or a metal complex having polyvalent coordination positions, may, for example, be used. Among them, an isocyanate compound, a melamine compound, a urea compound, an epoxy compound, a carbodiimide compound, an oxazoline group-containing compound, a zirconium salt compound or a silane coupling agent may, for example, be preferred. Or, such crosslinking agents may be used in combination.

In a case where the resin dispersion of the present invention is to be used as a primer, coating material or ink, a hydrophilic organic solvent other than water may be incorporated for the purpose of increasing the drying speed or to obtain a good finished surface. Such a hydrophilic organic solvent may, for example, be an alcohol such as methanol, ethanol or propanol, a ketone such as acetone, a glycol such as ethylene glycol or propylene glycol, or its ether. Further, an organic or inorganic compound other than the above-mentioned ones may be added to the resin dispersion within a range not to impair the stability of the resin dispersion.

Particularly, as a characteristic of the aqueous dispersion of the present invention, there is an excellent blending stability of the solvent. Usually, with a polyolefin aqueous dispersion employing a surfactant, if a hydrophilic organic solvent such as an alcohol is added, the surfactant is likely to be detached from the polyolefin and gelled. Whereas, with the aqueous dispersion of the present invention, the polyolefin itself is provided with an aqueous dispersibility, whereby even if a hydrophilic solvent is added, it will remain stably without undergoing gelation or coagulation, and thus it is useful for an ink to which a hydrophilic organic solvent is usually added.

[5-1] Combined Use of Other Resins

To the resin dispersion of the present invention, an aqueous resin or a resin dispersible in water may be mixed for use, as the case requires, within a range not to substantially impair the effects of the present invention. For example, such a combined use is effective for improving the coating exterior appearance (glazing or delustering) or to reduce tackiness. It may be a resin dispersible by means of a surfactant. As an aqueous resin, a resin mentioned as a hydrophilic polymer (B) may, for example, be used, and for example, an aqueous solution having such a resin dissolved in water may be mixed to the resin dispersion of the present invention.

The resin dispersible in water may, for example, be an acrylic resin, a polyepoxy resin, a polyester resin, a polyurethane resin, a melamine resin or an alkyd resin. The form of the resin dispersion containing such a resin and the polymer (C) is not particularly limited. For example, such a resin and the polymer (C) may, respectively, be emulsified and then mixed. By this method, particles made of such a resin and particles made of the polymer (C) are respectively separately formed, and an aqueous resin dispersion having the respective particles dispersed in water is obtainable.

Or, there is a method wherein such a resin and the polymer (C) are mixed and then emulsified. By this method, an aqueous resin dispersion is obtainable wherein particles each made of a mixture of such a resin and the polymer (C), are dispersed in water. For example, by permitting the polymer (C) to be coexistent during the polymerization of such a resin, two of them can be mixed and emulsified and dispersed in water to form particles each containing such a resin and the polymer (C). Otherwise, the resin and the polymer (C) may be separately synthesized, followed by e.g.

melt-kneading to mix them, followed by emulsification and dispersion in water to form particles each containing the resin and the polymer (C).

An aqueous resin dispersion wherein particles made of the polymer (C) and particles made of the resin are separately present, is preferred in order to let the polymer (C) and the resin exhibit the respective properties effectively. Such an aqueous resin dispersion may be obtained, for example, by mixing a dispersion having the polymer (C) emulsified and dispersed in water and a dispersion having the resin emulsified and dispersed in water.

With respect to the contents of the resins, the weight ratio of the copolymer (A) to said another resin is preferably from 90:10 to 10:90. Namely, based on 100 parts by weight of the total amount of the copolymer (A) and another resin, the amount of the copolymer (A) is preferably at least 10 parts by weight and at most 90 parts by weight. If the amount of the copolymer (A) is less than 10 parts by weight, the adhesion to a polyolefin substrate tends to be inadequate. It is more preferably at least 15 parts by weight, further preferably at least 20 parts by weight. If the amount of the copolymer (A) exceeds 90 parts by weight, the physical properties of a coating film obtainable from such a composite aqueous resin dispersion, specifically, the strength, water resistance, weather resistance, abrasion resistance, solvent resistance, etc. of the coating film, tend to be inadequate. It is more preferably at most 85 parts by weight, further preferably at most 80 parts by weight.

Further, with respect to the total resin content in the resin dispersion, the weight ratio of the total amount of the polymer (C) and said another resin to water is preferably within a range of from 5:95 to 60:40. Namely, based on 100 parts by weight of the total amount of the polymer (C), another resin and water, the total amount of the polymer (C) and another resin is at least 5 parts by weight and at most 60 parts by weight. If the total amount is less than 5 parts by weight, the working efficiency for coating, heat-curing, etc. tends to be poor. It is more preferably at least 10 parts by weight, further preferably at least 15 parts by weight. If it exceeds 60 parts by weight, the viscosity of the aqueous resin dispersion tends to be too high, the coating property tends to deteriorate, and a uniform coating film tends to be hardly formed. It is more preferably at most 55 parts by weight, further preferably at most 50 parts by weight.

In order to emulsify said another resin to form an aqueous resin dispersion, a surfactant may be used as the case requires. As such a surfactant, one mentioned in [5] may, for example, be used.

Further, the surfactant may be used also in the method wherein the polymer (C) and the resin are mixed and then emulsified.

In this case, the surfactant content in the resin dispersion is preferably at most 15 parts by weight per 100 parts by weight of the entire resin amount (the total amount of the polymer (C) and said another resin). It is more preferably at most 10 parts by weight, further preferably at most 5 parts by weight, particularly preferably at most 2 parts by weight. The surfactant may not substantially contained. "Not substantially contained" means that the surfactant is less than 1 part by weight per 100 parts by weight of the entire resin amount.

Said another resin is preferably at least one resin selected from the group consisting of an acrylic resin, a polyester resin, a polyurethane resin and an epoxy resin. The resin dispersion containing such a resin is suitable for a coating material. Hereinafter, such a resin will be generally referred to as a resin (D).

(D-1) Acrylic Resin

The acrylic resin as an example of said another resin in the present invention is not particularly limited so long as it is a (meth)acrylic polymer, but, it is a homopolymer or copolymer of acrylic acid and/or its ester, or a homopolymer or copolymer of methacrylic acid and/or its ester. Here, (meth)acrylic means acrylic and/or methacrylic.

A specific example of the (meth)acrylic acid ester may, for example, be a (meth)acrylic acid ester monomer having a $C_{1-12}$ alkyl group, such as methyl(meth)acrylate, ethyl (meth)acrylate, n-propyl(meth)acrylate, isopropyl(meth)acrylate, n-butyl(meth)acrylate, isobutyl(meth)acrylate, t-butyl(meth)acrylate, pentyl(meth)acrylate, hexyl(meth)acrylate, cyclohexyl(meth)acrylate, octyl(meth)acrylate, 2-ethylhexyl(meth)acrylate, nonyl(meth)acrylate, decyl (meth)acrylate or dodecyl(meth)acrylate, or a (meth)acrylic acid ester having a $C_{6-12}$ aryl or aralkyl group, such as phenyl(meth)acrylate or benzyl(meth)acrylate.

Or, it may, for example, be a (meth)acrylic acid ester having a $C_{1-20}$ alkyl group containing a hetero atom, such as dimethylaminoethyl(meth)acrylate, diethylaminoethyl (meth)acrylate, 2-aminoethyl(meth)acrylate, glycidyl(meth)acrylate, 2-hydroxyethyl(meth)acrylate, hydroxybutyl (meth)acrylate, 2-methoxyethyl(meth)acrylate, 3-methoxypropyl(meth)acrylate, or an adduct of (meth) acrylic acid and a polyethyleneoxide. Further, it may, for example, be a (meth) acrylic acid ester having a $C_{1-20}$ alkyl group containing fluorine atoms, such as trifluoromethyl (meth)acrylate, 2-trifluoromethylethyl(meth)acrylate or 2-perfluoroethylethyl(meth)acrylate, or a (meth)acrylamide monomer such as (meth)acrylamide or (meth)acryldimethylamide.

In addition to the above (meth)acrylic acid and/or its esters, ones having double bonds at the molecular terminals, so-called macromonomers are included. Such (meth)acrylic macromonomers usually have weight average molecular weights within a range of from a few hundreds to 50,000. Such a (meth)acrylic oligomer may be used usually within a range of from 1 to 80 parts by weight per 100 parts by weight of the above-mentioned (meth)acrylic acid and/or its esters.

Further, in addition to the above macromonomers, a caprolactone modified (meth)acrylic oligomer, a terminal hydroxyl group-containing (meth)acrylic oligomer, an oligoester(meth)acrylic oligomer, an urethane(meth)acrylate or an epoxy(meth)acrylate may, for example, be mentioned as an example of the acrylic resin.

To the acrylic resin, crosslinkable functional groups may be introduced in order to impart water resistance, heat resistance, solvent resistance or chemical resistance, and a crosslinking agent may be used in combination. For example, a copolymer having epoxy groups such as glycidyl (meth)acrylate is combined with a polyfunctional carboxylic acid or a polyfunctional amine as a crosslinking agent; a copolymer having hydroxyl groups such as 2-hydroxyethyl (meth)acrylate or hydroxybutyl(meth)acrylate is combined with a polyfunctional isocyanate; or a copolymer having carbonyl groups such as diacetone acrylamide or acrolein is combined with a crosslinking agent such as a polyfunctional hydrazine such as adipic acid dihydrazide or sebacic acid dihydrazide. Among them, the crosslinking system of the carbonyl group and the polyfunctional hydrazine is preferred, since it is curable at room temperature, while it can be stored in the form of one pack system. The amount of such crosslinkable functional groups is preferably at least 0.5 part by weight, more preferably at least 1 part by weight, per 100 parts by weight of the acrylic resin. However, it is preferably at most 20 parts by weight, more preferably at most 10 parts by weight, per 100 parts by weight of the acrylic resin. As it is higher than the lower limit value, an adequate crosslinking effect tends to be easily obtainable, and as it is lower than the upper limit value, the storage stability, etc. tend to increase.

The polymerization method to produce such an acrylic resin is not particularly limited, and for example, a method such as solution polymerization, bulk polymerization emulsion polymerization or suspension polymerization may be employed.

In order to emulsify in water, an acrylic resin obtained by solution polymerization or bulk polymerization to form an aqueous dispersion, emulsification-dispersion may be carried out by a mechanical force of e.g. a colloid mill in the presence or absence of the solution, and then the remaining solvent may be distilled off under reduced pressure or atmospheric pressure, as the case requires. When emulsion polymerization or suspension polymerization is employed, the polymer can be obtained directly in the form of an aqueous resin dispersion.

The acrylic resin useful for the present invention preferably has a number average molecular weight of at least 1,000, more preferably at least 20,000. However, it is preferably at most 1,000,000, more preferably at least 500,000.

Further, the particle diameter of the acrylic resin particles in the aqueous resin dispersion of the acrylic resin is preferably from 0.01 μm to 0.5 μm. Further, the solid content of the acrylic resin in the aqueous resin dispersion of the acrylic resin is preferably from 15 to 70 wt %. The liquid viscosity of the aqueous resin dispersion of the acrylic resin is preferably from 1 to 50,000 MPa·s.

(D-2) Polyurethane Resin

The polyurethane resin useful for the present invention is not particularly limited, and it may, for example, be a urethane polymer obtainable by reacting (i) a component containing an average of at least two active hydrogen atoms in one molecule with (ii) a polyvalent isocyanate component, or a urethane polymer obtainable by reacting an isocyanate group-containing prepolymer obtainable by reacting the above components (i) and (ii) under an isocyanate group excessive condition, with a chain extender such as a diol. In such urethane polymers, an acid component (an acid residue) may be contained.

Further, the chain extending method for the isocyanate group-containing prepolymer may be carried out by a known method. For example, using water, a water-soluble polyamine, a glycol or the like as a chain extender, an isocyanate group-containing prepolymer and the chain extender component may be reacted, if necessary, in the presence of a catalyst.

The component containing an average of at least two active hydrogen atoms in one molecule as the above component (i), is not particularly limited, but is preferably one having a hydroxyl group-based active hydrogen. The following may be mentioned as specific examples of such a compound.

(1) Diol compound: Ethylene glycol, propylene glycol, diethylene glycol, triethylene glycol, 1,2-butylene glycol, 1,3-butylene glycol, 2,3-butylene glycol, 1,4-butylene glycol, 1,5-pentanediol, neopentyl glycol, 1,6-hexane glycol, 2,5-hexanediol, dipropylene glycol, 2,2,4-trimethyl-1,3-pentanediol, tricyclodecanedimethanol, 1,4-cyclohexanedimethanol, etc.

(2) Polyether diol: An alkylene oxide adduct of the above diol compound, a ring-opening (co)polymer of an alkylene oxide or cyclic ether (such as tetrahydrofuran), for example, a polyethylene glycol, a polypropylene glycol, an ethylene glycol-propylene glycol (block or random) copolymer, a glycol, a polytetramethylene glycol, a polyhexamethylene glycol, a polyoctamethylene glycol, etc.

(3) Polyesterdiol: One obtained by polycondensation of a dicarboxylic acid (anhydride) such as adipic acid, succinic acid, sebacic acid, glutaric acid, maleic acid, fumaric acid or phthalic acid with a diol compound such as ethylene glycol, propylene glycol, 1,4-butanediol, 1,6-hexanediol, 1,8-octamethylenediol or neopentyl glycol, as mentioned in the above (1) under hydroxyl group-excessive condition. Specifically, an ethylene glycol-adipic acid condensate, a butanediol-adipic condensate, a hexamethylene glycol-adipic acid condensate, an ethylene glycol-propylene glycol-adipic acid condensate, or a polylactonediol obtained by ring-opening polymerization of lactone using glycol as an initiator, may, for example, be exemplified.

(4) Polyetheresterdiol: One obtained by adding an ether group-containing diol (such as the polyetherdiol or diethylene glycol in the above (2)) or a mixture thereof with other glycol, to a dicarboxylic acid (anhydride) as exemplified in the above (3), followed by a reaction with an alkylene oxide. For example, a polytetramethylene glycol-adipic acid condensate, etc. may be mentioned.

(5) Polycarbonatediol: A compound represented by the formula HO—R—(O—C(O)—O—R)x-OH (wherein R is a $C_{1-12}$ saturated fatty acid diol residue, x is the number of repeating units of the molecule and usually is an integer of from 5 to 50), etc. Such a compound can be obtained by an ester exchange method of reacting a saturated aliphatic diol with a substituted carbonate (such as diethyl carbonate or diphenyl carbonate) under such a condition that hydroxyl groups would be excessive, or a method of reacting the above saturated aliphatic diol with phosgene, and if necessary, then, further reacting a saturated aliphatic diol.

The compounds as exemplified in the above (1) to (5) may be used alone or in combination as a mixture of two or more of them.

As the polyvalent isocyanate component (ii) to be reacted with the above component (i), an aliphatic, alicyclic or aromatic compound having an average of at least two isocyanate groups per molecule may be used.

As the aliphatic diisocyanate compound, a $C_{1-12}$ aliphatic diisocyanate is preferred, and it may, for example, be hexamethylene diisocyanate or 2,2,4-trimethylhexane diisocyanate. As the alicyclic diisocyanate compound, a $C_{4-18}$ alicyclic diisocyanate is preferred, and it may, for example, be 1,4-cyclohexane diisocyanate or methylcyclohexylene diisocyanate. As the aromatic isocyanate, tolylene diisocyanate, 4,4'-diphenylmethane diisocyanate or xylylene diisocyanate may, for example, be mentioned.

Further, one containing acid residues in an urethane polymer can be dispersed in water without using a surfactant or with a small amount of a surfactant, whereby water resistance of a coating film is expected to be improved. The content of acid residues is suitably within a range of from 25 to 150 (mgKOH/g), preferably from 30 to 100 (mgKOH/g), as an acid value of the urethane polymer. If the acid value is less than 25, the dispersibility in water tends to be inadequate, and it will be required to use a surfactant in many cases. On the other hand, if the acid value is larger than 150, the water resistance of the coating film tends to be poor.

As a method for introducing acid groups into an urethane polymer, a conventional method may be used without any particular restriction. For example, a method for introducing acid groups is preferred wherein a dimethylol alkanoic acid is substituted for some or all of the glycol components mentioned in the above (2) to (4) to have carboxyl groups preliminarily introduced to a polyether diol, a polyester diol or a polyether ester diol. The dimethylol alkanoic acid to be used here may, for example, be dimethylol acetic acid, dimethylol propionic acid or dimethylol butyric acid.

The urethane resin useful for the present invention preferably has a number average molecular weight of at least 1,000, more preferably at least 20,000. However, the number average molecular weight is preferably at most 1,000,000, more preferably at most 200,000.

In a case where the aqueous dispersion of the above polyurethane resin of the present invention is to be produced, its production method is not particularly limited, and it can be produced in accordance with the above-described method for producing the aqueous dispersion of an acrylic resin.

The particle diameter of the above polyurethane resin in the aqueous resin dispersion is preferably from 0.01 μm to 0.5 μm. Further, the solid content of the polyurethane resin in the aqueous resin dispersion of the polyurethane resin is preferably from 15 to 70 wt %. The liquid viscosity of the aqueous resin dispersion of the polyurethane resin is preferably from 1 to 10,000 mPa·s.

(D-3) Polyester Resin

The polyester resin useful for the present invention is not particularly limited, and it may, for example, be one obtained by poly-condensing a dicarboxylic acid such as adipic acid, succinic acid, sebacic acid, glutaric acid, maleic acid, fumaric acid or phthalic acid, and/or its anhydride, with a diol compound such as ethylene glycol, propylene glycol, 1,4-butanediol, 1,6-hexanediol, 1,8-octamethylenediol or neopentyl glycol, or an ether group-containing diol (such as polyethylene glycol, polypropylene glycol or polytetramethylene glycol).

Specifically, it may, for example, be an ethylene glycol-adipic acid condensate, a butanediol-adipic acid condensate, a hexamethylene glycol-succinic acid condensate, ethylene glycol-propylene-glycol-phthalic acid condensate or a polyethylene glycol-adipic acid condensate.

An aqueous dispersion of a polyester resin is obtainable by emulsifying it in water in the presence or absence of a surfactant. The production method is not particularly limited, but it can be produced in accordance with the above-mentioned method for producing an aqueous dispersion of an acrylic resin. One available as a commercial product may, for example, be Vylonal MD-1200 or MD-1245, manufactured by Toyobo Co., Ltd.

The polyester resin useful for the present invention preferably has a number average molecular weight of at least 1,000, more preferably at least 5,000. However, the number average molecular weight is preferably at most 500,000, more preferably at most 100,000.

The particle diameter of the above polyester resin in the aqueous resin dispersion is preferably from 0.01 μm to 0.5 μm. Further, the solid content of the polyester resin in the aqueous resin dispersion of the polyester resin is preferably from 15 to 70 wt %. The liquid viscosity of the aqueous resin dispersion of the polyester resin is preferably from 1 to 10,000 mPa·s.

(D-4) Epoxy Resin

The epoxy resin useful for the present invention is not particularly limited so long as it is a polymer having at least one epoxy group per molecule. For example, it may be a polyvalent glycidyl ether of phenol which can be produced by reacting a polyhydric phenol with epichlorohydrin in the presence of an alkali, or an epoxy group-containing polymer obtainable by reacting such a polyvalent glycidyl ether of phenol with the above-mentioned polyhydric phenol.

The polyhydric phenol which may be used here, may, for example, be bis(4-hydroxyphenyl)-2,2-propane, 4,4'-dihydroxybenzophenone, bis(4-hydroxyphenyl)-1,1-ethane, bis(4-hydroxyphenyl)-1,1-isobutane, bis(4-hydroxy-t-butylphenyl)-2,2-propane, bis(2-hydroxynaphthyl)methane or 1,5-dihydroxynaphthalene.

Instead of such a polyhydric phenol, a hydrogenated compound having hydrogen added to some or all of double bonds in its phenyl nucleus, may be used.

Further, as the epoxy resin, a polyglycidyl ether of a phenolic novolac resin, or a polyglycidyl ether of a polyhydric alcohol may also be used. Such a polyhydric alcohol may, for example, be ethylene glycol, diethylene glycol, triethylene glycol, 1,2-propylene glycol, 1,4-propylene glycol, 1,5-pentanediol, 1,2,6-hexanetriol, glycerol, bis(4-hydroxycyclohexyl)-2,2-propane or sorbitol.

An aqueous dispersion of an epoxy resin is obtainable by emulsifying such an epoxy resin in water in the presence or absence of a surfactant. The production method is not particularly limited, but it can be produced in accordance with the above-described method for producing an aqueous dispersion of an acrylic resin.

A typical commercial product may, for example, be Denacol EM150 manufactured by Nagase ChemteX Corporation, obtained by forcibly emulsifying by a surfactant (emulsifier) novolac type epoxy resin obtained by adding epichlorohydrin to a phenol novolac resin, Epi-Rez 6006W70 or 5003W55, manufactured by Japan Epoxy Resins Co., Ltd. or WEX-5100, manufactured by Tohto Kasei Co., Ltd.

Further, Denacol EM151 or EM103, obtained by forcibly emulsifying, by an emulsifier, a bisphenol type epoxy resin obtained by similarly adding epichlorohydrin to bisphenol, or Epi-Rez 3510W60, 3515W6, 3522W60 or 3540WY55, manufactured by Japan Epoxy Resins Co., Ltd., may, for example, be mentioned.

Further, as an epoxy resin of alkyl type having epichlorohydrin added to a polyol such as sorbitol, pentaerythritol or glycerol, Denacol EX-611, EX-614, EX-411 or EX-313, manufactured by Nagase ChemteX Corporation may, for example, be mentioned.

[5-2] Addition of Pigment

A pigment (E) may be added to the resin dispersion of the present invention. The aqueous resin dispersion containing the pigment (E) is suitable as a coating material.

The pigment which may be used is not particularly limited and may, for example, be a coloring pigment, such as an inorganic pigment such as titanium oxide, carbon black, iron oxide, chromium oxide, iron blue, red oxide, chrome yellow or yellow oxide, or an organic pigment such as an azo pigment, an anthracene pigment, a perynone pigment, a perylene pigment, a quinacridone pigment, an isoindolynone pigment, an indigo pigment or a phthalocyanine pigment; an extender pigment such as talc, calcium carbonate, clay, kaolin, silica or precipitated barium sulfate; a conductive pigment such as conductive carbon or whiskers coated with antimony-doped tin oxide; or a colorless or colored metal glitter such as a metal or alloy such as aluminum, copper, zinc, nickel, tin or aluminum oxide. They may be used alone or in combination as a mixture of two or more of them.

The amount of the pigment (E) to be added to the resin dispersion is preferably at least 10 parts by weight per 100 parts by weight of the resins (the total amount of the polymer (C) and other resins). It is more preferably at least 50 parts by weight. However, it is preferably at most 400 parts by weight, more preferably at most 200 parts by weight. As the amount increases from the lower limit value, the color-forming or hiding property tends to be high, and as the amount is smaller than the upper limit value, the adhesion, moisture resistance and oil resistance tend to be high.

At that time, a pigment dispersant may be employed. For example, an aqueous acrylic resin such as JONCRYL resin manufactured by Johnson Polymer Corporation; an acidic block copolymer such as BYK-190 manufactured by BYK-Chemie; a styrene-maleic acid copolymer; an acetylene diol derivative such as SURFYNOL T324 manufactured by Air Products; a water-soluble carboxymethylacetate butyrate such as CMCAB-641-0.5 manufactured by Eastman Chemical Company, may, for example, be mentioned. By using such a pigment dispersant, a stable pigment paste can be prepared.

The resin dispersion of the present invention is useful for a primer, a primerless coating material, an adhesive, an ink, etc. The present invention is particularly useful for a primer, a coating material or an adhesive. It is particularly suitable for a polyolefin substrate. For example, it is useful as a coating material for automobiles such as for interior or exterior of automobiles, a coating material for home electronics such as mobile phones or personal computers or a coating material for building materials.

[6] Laminate

The resin dispersion of the present invention or a coating material containing it may be applied and heated on a substrate to form a resin layer thereby to obtain a laminate. This resin layer is a layer comprising the polymer (C) having a hydrophilic polymer (B) bonded, or having an acidic group bonded, to a propylene/α-olefin copolymer (A) as a copolymer of propylene with an α-olefin other than propylene, wherein the copolymer (A) has a propylene content of at least 50 mol % and less than 10 mol %; the copolymer (A) has a weight average molecular weight Mw of at least 10,000 and a molecular weight distribution Mw/Mn of at most 3.5; and the surfactant content is at most 15 parts by weight per 100 parts by weight of the polymer (C).

Such a laminate is useful for various applications for e.g. automobiles, home electronics or buildings. The substrate may be of any form such as a film, sheet or plate.

The hardness of the resin layer may be made soft or hard by selecting the types and amounts of (A) and (B) depending upon the particular application. For example, a coating material for the exterior of an automobile is required to provide a hard nature, and a hard layer is selected, while for the interior of an automobile, a soft nature is required and a soft layer is selected for use. The hardness may be evaluated by a tensile modulus or a flexural modulus.

The resin dispersion of the present invention may be applied on a molded product (a substrate) of an olefin polymer having crystallinity to form a coating film. The olefin polymer as the substrate may, for example, be an olefin polymer such as high pressure method polyethylene, medium or low pressure method polyethylene, polypropylene, poly-4-methyl-1-pentene, poly-1-butene or polystyrene, or an olefin copolymer such as an ethylene-propylene copolymer, an ethylene-butene copolymer or a propylene-butene copolymer. Among these olefin copolymers, a propylene polymer is preferably employed. Further, it may be used also for the surface treatment of a molded product made of polypropylene and synthetic rubber, a molded product made of a polyamide resin, an unsaturated polyester resin, a polybutylene terephthalate resin or a polycarbonate resin, such as a molded product such as a bumper for an automobile, a steel plate, or a steel plate for electrodeposition.

The molded product to which the resin dispersion of the present invention may be applied, may be one obtained by molding any one of the above-mentioned various polymers or resins by any method selected from known molding methods such as injection molding, compression molding, blow molding, extrusion molding and rotation molding.

Also in a case where an inorganic filler such as talc, zinc white, glass fiber, titanium white or magnesium sulfate, a pigment, etc., is incorporated to such a molded product, it is possible to form a coating film with good adhesion.

[6-1] Method for Producing Laminate

The method for forming a resin layer on a substrate is not particularly limited, and a conventional method may be used. For example, it may be a coating method for applying the resin dispersion or the coating material by spraying, a method for applying it by rollers, or a method for applying it by using a brush.

After applying the resin dispersion or the coating material, the coated film is cured usually by heating by a nichrome wire, infrared ray or radiofrequency wave to obtain a laminate having a desired coated film on its surface. The conditions for curing the coated film are suitably selected depending upon the material and shape of the substrate, the composition of the coating material used, etc. The curing temperature is not particularly limited, but in consideration of practical efficiency, it is usually at least 50° C., preferably at least 60° C. However, it is usually at most 150° C., preferably at most 130° C.

The thickness (after curing) of the resin layer to be laminated may suitably selected depending upon the material and shape of the substrate, the composition of the coating material used, etc., but it is usually at least 0.1 μm, preferably at least 1 μm, more preferably at least 5 μm. However, it is usually at most 500 μm, preferably at most 300 μm, more preferably at most 200 μm.

[6-2] Thermoplastic Resin Molded Product (F)

As the substrate for the laminate of the present invention, a thermoplastic resin molded product is preferred. The thermoplastic resin molded product (F) is not particularly limited, and for example, it is a molded product made of a polyolefin resin, a polyamide resin, a polyethylene terephthalate resin, a polybutyrene terephthalate resin or a polycarbonate resin. Among them, the present invention is preferably applicable to a thermoplastic resin molded product (F) made of a polyolefin resin (hereinafter referred to as a polyolefin molded product).

The polyolefin molded product is usually a molded product of crystalline polyolefin, and known various polyolefins may be employed without any particularly restriction. For example, a homopolymer of ethylene or propylene, a copolymer of ethylene and propylene, a copolymer of ethylene or/and propylene with another comonomer such as an α-olefin comonomer having at least two carbon atoms, such as 1-butene, 1-pentene, 1-hexene, 1-heptene, 1-octene, cyclopentene, cyclohexane or norbornene, or a copolymer of two or more types of such comonomers, may be used.

As the α-olefin comonomer, a $C_{2-6}$ α-olefin comonomer is preferred. Further, a copolymer of an α-olefin monomer with a comonomer such as vinyl acetate, an acrylic acid ester or a methacrylic acid ester, a copolymer thereof with a comonomer such as an aromatic vinyl monomer, or its hydrogenated product, or a hydrogenated product of a conjugated diene block copolymer may, for example, be also used. Here, when a simple term of a copolymer is used, it may be a random copolymer or a block copolymer. Further, the polyolefin may be modified as the case requires.

They may be used alone or in combination as a mixture depending upon the particular application.

The melt flow rate (MFR) of the polyolefin is preferably at least 2 g/10 min, more preferably at least 10 g/10 min, particularly preferably at least 25 g/10 min. However, it is preferably at most 300 g/10 min, more preferably at most 200 g/10 min. When MFR is higher than the lower limit value, the flowability of the polyolefin tends to increase. Inversely, when MFR is lower than the upper limit value, the mechanical properties tend to be high. MFR of the polyolefin may be adjusted during the polymerization or may be adjusted after the polymerization by an organic peroxide such as diacyl peroxide or dialkyl peroxide.

The polyolefin is more preferably a crystalline polypropylene. The crystalline polypropylene is a propylene homopolymer and/or propylene-ethylene copolymer. Here, a propylene-ethylene copolymer is a propylene-ethylene random copolymer and/or a propylene-ethylene block copolymer, preferably a propylene-ethylene block copolymer.

Here, a propylene-ethylene block copolymer comprises crystalline polypropylene portions (a unit portions) and ethylene-propylene random copolymer portions (b unit portions).

The above a unit portions are obtained usually by homopolymerization of propylene, or in some cases, by copolymerization of propylene with a small amount of another α-olefin.

MFR of the polypropylene homopolymer for the a unit portions is preferably at least 10 g/10 min, more preferably at least 15 g/10 min, further preferably at least 20 g/10 min, particularly preferably at least 40 g/10 min. Further, it is preferably at most 500 g/10 min, more preferably at most 400 g/10 min, further preferably at most 300 g/10 min.

As this MFR is higher than the lower limit value, the fluidity tends to increase. Inversely, as MFR is lower than the above upper limit value, the mechanical properties tend to be high.

On the other hand, the b unit portions are a rubber component obtainable by random copolymerization of propylene and ethylene. The propylene content in the propylene-ethylene random copolymer portion of the b unit portions is preferably at least 30 wt %, more preferably at least 40 wt %, further preferably at least 50 wt %. However, it is preferably at most 85 wt %, more preferably at most 80 wt %, further preferably at most 75 wt %. When the propylene content is within this range, its dispersibility and the glass transition temperature will be in proper ranges, and the impact properties tend to be good. The propylene content can be adjusted by controlling the concentration ratio of propylene to ethylene at the time of polymerization of the propylene-ethylene random copolymer portion.

The molecular weight of the propylene-ethylene random copolymer portion of the b unit portions is not particularly limited. However, in consideration of the dispersibility and impact resistance, the weight average molecular weight (Mw) is preferably from 200,000 to 3,000,000, more preferably from 300,000 to 2,500,000, further preferably from 400,000 to 2,000,000.

The amounts of the a unit portions and the b unit portions are not particularly limited. However, usually, the a unit portions are preferably at most 95 wt %, more preferably from 50 to 95 wt %, further preferably from 60 to 90 wt %, based on the entire amount, and the b unit portions are preferably at least 5 wt %, more preferably from 5 to 50 wt %, further preferably from 10 to 40 wt %, based on the entire amount. When the amount of the b unit portions is higher than the lower limit value, the impact resistance tends to be high, and when it is lower than the upper limit value, the rigidity, strength and heat resistance tend to be high.

In the present invention, the amount of the b unit portions is measured by means of a temperature-rising elution fractionation method. Namely, in extraction with o-dichlorobenzene, the a unit portions will not be eluted at a temperature of at most 100° C., but the b unit portions will be easily eluted. Accordingly, the propylene-ethylene block copolymer after the production is subjected to the above extraction analysis by means of o-dichlorobenzene, whereby the composition is determined.

The ratio of the amounts of the a unit portions and the b unit portions is determined by the polymerization amount of the propylene homopolymer portion and the polymerization amount of the propylene-ethylene random copolymer portion. Accordingly, it can be adjusted, for example, by controlling the respective polymerization periods of time.

The methods for producing the propylene homopolymer and the propylene-ethylene block copolymer are not particularly limited, and they are suitably selected from known methods and conditions.

As a polymerization catalyst for propylene, a highly stereoregular catalyst is usually employed. For example, a catalyst obtained by combining an organic aluminum compound and an aromatic carboxylic acid ester, with a titanium trichloride composition obtained by reducing titanium tetrachloride with an organic aluminum compound and further treating it with various electron donors and electron acceptors (JP-A-56-100806, JP-A-56-120712, JP-A-58-104907), or a supported catalyst obtained by contacting a magnesium halide with titanium tetrachloride and various electron donors (JP-A-57-63310, JP-A-63-43915, JP-A-63-83116) may, for example, be mentioned. Further, a metallocene catalyst as shown in WO91/04257 may also be mentioned. Here, the metallocene catalyst may not contain alumoxane, but preferred is a catalyst having a metallocene compound and alumoxane combined i.e. a so-called Kaminsky catalyst.

The propylene-ethylene block copolymer is obtained by firstly homo-polymerizing propylene in the presence of the above catalyst by applying a production process such as a gas phase polymerization method, a liquid phase bulk polymerization method or a slurry polymerization method, followed by random polymerization of propylene and ethylene. In order to obtain a propylene-ethylene block copolymer having the above-mentioned melting properties (MFR), it is preferred to carry out multi-stage polymerization by using a slurry method or a gas phase fluidized bed method. Otherwise, it can be obtained by a method of carrying out homopolymerization of propylene by multi-stages, followed by random polymerization of propylene and ethylene. In a case where a propylene-ethylene block copolymer having a large amount of the b unit portions is to be prepared, a gas phase fluidized bed method is particularly preferred.

The propylene homopolymer is obtained by polymerizing propylene alone in the presence of the above catalyst by applying a production process such as a gas phase polymerization method, a liquid phase bulk polymerization method or a slurry polymerization method. In order to obtain a propylene homopolymer having the above-mentioned melting properties (MFR), it is preferred to carry out multistage polymerization by using a slurry method or a gas phase fluidized bed method.

The propylene homopolymer and the propylene-ethylene block copolymer of the present invention are desired to be excellent in mechanical properties and have high rigidity and impact resistance, so that they are useful as structural materials. Namely, the flexural modulus is preferably at least 300 MPa, more preferably from 500 to 3,000 MPa, further preferably from 1,000 to 2,000 MPa. Within such range, they will be excellent in rigidity and will be ones suitable as structural materials. Further, the IZOD impact strength is preferably at least 1 kJ/m$^2$, more preferably from 2 to 100 kJ/m$^2$, further preferably from 5 to 80 kJ/m$^2$, particularly preferably from 8 to 60 kJ/m$^2$. Within this range, they will be excellent in impact resistance and will be ones suitable as structural materials.

The thermoplastic resin molded products may be used alone or in a combination of two or more of them.

[6-3] Inorganic Filler Component

The thermoplastic resin molded product (F) to be used in the present invention may contain an inorganic filler component.

Particularly, by incorporating an inorganic filler component to a crystalline polyolefin, it is possible to improve the mechanical properties such as the flexural modulus, rigidity, etc., of the molded product.

Specifically, a plate-form filler such as talc, mica or montmorillonite; a fiber-form filler such as short glass fiber, long glass fiber, carbon fiber, alamide fiber, alumina fiber, boron fiber or zonolite; a needle-form (whisker) filler such as potassium titanate, magnesium oxysulfate, silicon nitride, aluminum borate, basic magnesium sulfate, zinc oxide, wollastonite, calcium carbonate or silicon carbonate; a particle-form filler such as precipitated calcium carbonate, heavy calcium carbonate or magnesium carbonate; or a balloon-form filler such as glass balloon, may, for example, be mentioned. An inorganic filler or pigment such as zinc white, titanium white or magnesium sulfate may also be used. Among them, from the balance of the physical properties and costs, talc, mica, glass fiber or whisker is preferred, and more preferred is talc, mica or glass fiber.

The inorganic filler component may be surface-treated with e.g. a surfactant or coupling agent. The surface-treated filler has an effect to further improve the strength or heat resistant rigidity of the molded product.

The amount of the inorganic filler component to be used, is selected within a wide range depending upon the purpose and application of the molded product. It is preferably from 1 to 80 parts by weight, more preferably from 2 to 75 parts by weight, further preferably from 5 to 60 parts by weight, per 100 parts by weight of the crystalline polyolefin.

By incorporating the inorganic filler component, the flexural modulus of the crystalline polyolefin can be improved to be preferably at least 1,000 MPa, more preferably 1,500 to 10,000 MPa, further preferably from 2,000 to 8,000 MPa. Further, the IZOD impact strength can be improved to be preferably at least 1 kJ/m$^2$, more preferably from 2 to 80 kJ/m$^2$, further preferably from 4 to 60 kJ/m$^2$.

Such inorganic fillers may be used alone or in combination as a mixture of two or more of them.

Now, preferred fillers will be described in detail.

(1) Talc

The average particle diameter of talc to be used in the present invention is usually at most 10 μm, preferably from 0.5 to 8 μm, more preferably from 1 to 7 μm. The average particle diameter value is a particle diameter value at 50 wt % of the cumulative amount read out from a particle size cumulative distribution curve drawn from the results of measurement by a laser diffraction method (such as LA920W, manufactured by HORIBA, Ltd.) or by a liquid phase precipitation system light transmission method (such as CP model, manufactured by Shimadzu Corporation). The value in the present invention is an average particle diameter value measured by the laser diffraction method.

As such talc, fine particulate one obtainable by mechanically finely pulverizing natural talc and further precisely classifying it, is used. One once roughly classified may further be classified.

As the mechanical pulverization method, a method of employing a pulverizer such as a jaw crusher, a hummer crusher, a roll crusher, a screen mill, a jet pulverizer, a colloid mill, a roller mill or a vibration mill may be mentioned. The pulverized talc was once or repeatedly classified in a wet system or dry system by an apparatus such as a cyclone, a cyclone air separator, a microseparator or a sharp cut separator, to adjust the size to the above-mentioned average particle diameter.

As a method for producing talc for the present invention, it is preferred to carry out the classification operation by a sharp cut separator after pulverizing it to a specific particle size.

Such talc may be surface-treated with various organic titanate coupling agents, organic silane coupling agents, modified polyolefins having an unsaturated carboxylic acid or its anhydride grafted, fatty acids, metal salts of fatty acids, or fatty acid esters, for the purpose of improving the adhesion to the polymer or the dispersibility.

(2) Glass Fiber

As glass fiber, it is common to employ glass chopped strands. The length of such glass chopped strands is usually from 3 to 50 mm, and the diameter of the fibers is usually from 3 to 25 μm, preferably from 8 to 14 μm.

As such glass chopped strands, it is preferred to employ ones having surface modification applied by means of a silane compound or having surface treatment applied by means of e.g. a polyvinyl alcohol, a polyvinyl acetate, a polyurethane, an epoxy resin or a bundling agent such as an olefin component.

The olefin component as a bundling agent may, for example, be an unsaturated carboxylic acid-modified polyolefin or a low molecular weight polyolefin.

In the present invention, in order to improve the mechanical strength by the interfacial adhesion of the crystalline polyolefin and the glass fiber, a polyolefin modified by an unsaturated carboxylic acid and/or its derivative may be incorporated. Particularly preferred is one modified, with a polypropylene being the matrix, and it is preferred to employ one having a modification ratio of from 0.1 to 10 wt %.

(3) Mica

Mica is preferably one having an average particle diameter of from 2 to 100 μm and an average aspect ratio of at least 10, more preferably one having an average particle diameter of from 2 to 80 μm and an average aspect ratio of at least 15. When the average particle diameter of mica is within the above range, it is possible to more improve the scratch resistance and impact strength of the molded product and to prevent deterioration of the exterior appearance.

Further, the mica may be any one of so-called white mica, gold mica and black mica. However, gold mica or white mica is preferred, and white mica is more preferred.

The method for producing mica is not particularly limited, and it may be produced by a method similar to the above-mentioned method for producing talc. A dry pulverization-wet classification system or a wet pulverization-wet classification system is preferred. The wet pulverization-wet classification system is more preferred.

[6-4] Elastomer Component

In a case where the thermoplastic resin molded product (F) to be used in the present invention is a crystalline polyolefin molded product, an elastomer component may further be incorporated, whereby it is possible to improve the impact resistant strength of the molded product.

Such an elastomer component may, for example, be an ethylene-α-olefin random copolymer rubber, an ethylene-α-olefin-non-conjugated diene copolymer rubber or a styrene-containing thermoplastic elastomer. As a specific example, an ethylene-α-olefin copolymer rubber such as an ethylene-propylene copolymer rubber, an ethylene-1-butene copolymer rubber, an ethylene-1-hexene copolymer rubber or an ethylene-1-octene copolymer rubber; an ethylene-α-olefin-non-conjugated diene copolymer rubber such as an ethylene-propylene-ethylidene norbornene copolymer rubber (EPDM) or a styrene-containing thermoplastic elastomer such as a hydrogenated product of styrene-butadiene-styrene triblock (SEBS) or a hydrogenated product of styrene-isoprene-styrene triblock (SEPS), may be mentioned.

These elastomers may be produced as described below.

MFR (230° C., load: 2.16 kg) of such an elastomer component is preferably from 0.5 to 150 g/10 min, more preferably from 0.7 to 100 g/10 min, further preferably from 0.7 to 80 g/10 min, when exterior material for automobiles is taken into consideration as one of the main applications of the present invention.

Such elastomer components may be used alone or in combination as a mixture of two or more of them.

[6-5] Other Components

The thermoplastic resin molded product (F) may contain, in addition to the above components, optional additives or blend components within a range not to substantially impair the effects of the present invention. Specifically, a coloring pigment, an antioxidant of e.g. phenol type, sulfur type or phosphorus type, an antistatic agent, a photostabilizer such as a hindered amine, an ultraviolet absorber, various nucleating agents such as organic aluminum talc, a dispersant, a neutralizing agent, a blowing agent, a copper inhibitor, a lubricant, a flame retardant, and a resin such as a polyethylene resin, may, for example, be mentioned.

[6-6] Method for Producing Thermoplastic Resin Molded Product (F)

To the above-mentioned resin, various components are blended as the case requires, followed by mixing and melt-kneading. The kneading method is not particularly limited, and by kneading and granulating by means of a usual kneading machine such as a single screw extruder, a twin screw extruder, a Banbury mixer, a roll mixer, a bravender plastograph or a kneader, a thermoplastic resin composition to constitute the thermoplastic resin molded product (F) of the present invention will be obtained. It is preferred to employ a twin screw extruder in order to let the respective components be well dispersed.

At the time of such kneading and granulation, the above-mentioned respective components may simultaneously be kneaded, or in order to improve the performance, the respective components may be separately kneaded.

Then, the thermoplastic resin composition is molded to obtain the thermoplastic resin molded product (F). As a molding method, various known methods may be employed.

For example, injection molding (inclusive of gas injection molding), compression molding, injection compression molding (press injection), extrusion molding, blow molding, rotational molding, calendar molding, inflation molding, uniaxially stretched film forming or biaxial stretched film forming may, for example, be mentioned. Preferably, injection molding, compression molding or injection compression molding is employed, and in consideration of the productivity, etc., injection molding is particularly preferred.

[6-7] Application of Laminate

The laminate of the present invention is excellent in coating film adhesion and further has an excellent physical property balance with respect to rigidity and impact resistance. Further, in a case where the resin layer constituting the laminate contains substantially no surfactant, there will be no bleeding out, and the exterior appearance will be excellent. Further, it is not required to contain a halogen such as chlorine, whereby the environmental load can be reduced.

Accordingly, the laminate of the present invention is useful for various industrial components for e.g. automobiles, home electronic products and building materials, and it provides a practically sufficient performance as a component or material which is made to have a thin wall thickness, a high functionality or a large size.

For example, it can be used as a molding material for various industrial components, such as an automobile component such as a bumper, an instrument panel, a trim or a garnish; a home electronic instrument component such as a TV casing, a washing machine vessel, a refrigerator component, an air conditioner component or a cleaner component; a toiletry component such as a toilet sheet, a toilet sheet cover or a water tank; a component around a bathroom such as a bath tub, a wall of a bathroom, a ceiling or drainage.

EXAMPLES

Now, the present invention will be described in further detail with reference to Examples, but it should be understood that the present invention is by no means restricted to the following Examples. In the following, "parts" means "parts by weight".

<Methods for Measuring and Evaluating Physical Properties>

(1) Stereoregularity

The propylene content [P] in a propylene-butene copolymer was measured by a $^{13}$C-NMR spectrum measuring method by means of an NMR apparatus (manufactured by JEOL Ltd., 400 MHz). A sample of from 350 to 500 mg, was completely dissolved by using about 2.2 ml of o-dichlorobenzene in an NMR sample tube of 10 mm in diameter. Then, as a lock solvent, about 0.2 ml of deuterated benzene was added and homogenized, and then, measurement was carried out by a proton complete decoupling method at 130° C. The measurement conditions were such that the pulse angle was 90°, a pulse interval-pulse interval was 10 seconds, and the number of integration times was 6,000 times.

The chemical shifts and contents of propylene and butene were calculated with reference to the description by J. C. Randall, Macromolecules, 11, 592 (1978).

(2) Weight Average Molecular Weight (Mw) and Molecular Weight Distribution [Mw/Mn]

(2)-1 Method for Measuring Molecular Weight Calculated as Polypropylene

Firstly, 20 mg of a sample was put into a 30 ml vial container, and 20 g of o-dichlorobenzene containing 0.04 wt % of BHT as a stabilizer was added. Using an oil bath heated to 135° C., the sample was dissolved and then thermal filtration was carried out by a PTFE (polytetrafluoroethylene) filter having a pore diameter of 3 μm to prepare a sample solution having a polymer concentration of 0.1 wt %. Then, using GPC150CV manufactured by Waters and equipped with TSKgel GM H-HT (30 cm×4 columns) as columns and an RI detector, GPC measurement was carried out. The measurement conditions were such that injection amount of the sample solution: 500 μl, the column temperature: 135° C., solvent: o-dichlorobenzene, and the flow rate: 1.0 ml/min.

At the time of calculation of a molecular weight, using commercially available monodisperse polystyrene as a standard sample, from the viscosity equation of the polystyrene standard sample and a polypropylene, a calibration curve relating to the retention time and the molecular weight was prepared, and calculation of the molecular weight of the propylene/α-olefin copolymer was carried out.

As the viscosity equation, $[\eta]=K \cdot M^{\alpha}$ was used, and for the polystyrene, K=1.38E-4, and α=0.70 were used, and for the propylene/α-olefin copolymer, K=1.03E-4, and α=0.78 were used.

Further, the molecular weight distribution Mw/Mn was calculated from the obtained values of weight average molecular weight Mw and number average molecular weight Mn.

(2)-2 Method for Measuring Molecular Weight Calculated as Polystyrene

Firstly, 5 mg of a sample was put into a 10 ml vial container, and 5 g of tetrahydrofuran containing 250 ppm of BHT as a stabilizer was added and completely dissolved at 50° C. The solution was cooled to room temperature and then filtered through a filter having a pore diameter of 0.45 μm to prepare a sample solution having a polymer concentration of 0.1 wt %. Then, using GPC HLC-8020 manufactured by TOSOH CORPORATION and having a guard column TSKguardcolummH$_{XL}$-H mounted on TSKgel GMH$_{XL}$-L (30 cm×2 columns) as columns, GPC measurement was carried out. The measurement conditions were such that injection amount of the sample solution: 50 μl, the column temperature: 40° C., solvent: tetrahydrofuran, and the flow rate: 1.0 ml/min.

At the time of calculation of a molecular weight, commercially available monodisperse polystyrene was measured as a standard sample, and a calibration curve was prepared from the retention time and the molecular weight of the standard sample, whereupon the calculation was carried out.

(3) Temperature Rising Elution Fractionation (TREF)

A sample was dissolved in o-dichlorobenzene (containing 0.5 mg/ml of BHT (2,6-di-t-butyl-4-methylphenol)) at 140° C. to obtain a solution. This solution was introduced into a TREF column at 140° C., then cooled to 100° C. at a temperature lowering rate of 8° C./min, continuously cooled to −15° C. at a temperature lowering rate of 4° C./min and held for 60 minutes. Thereafter, o-dichlorobenzene (containing 0.5 mg/ml of BHT) as a solvent was permitted to flow through the column at a flow rate of 1 ml/min thereby to let the component dissolved in the o-dichlorobenzene at −15° C. in the TREF column elute for 10 minutes. Then, the column was heated to 140° C. linearly at a temperature raising rate of 100° C./hr, whereby the eluted amounts were detected at intervals of 0.1° C. From the obtained results, the integrated eluted amount (wt %) for every temperature was calculated.

The measuring apparatus and the measuring conditions are shown below.

Measuring Apparatus
(TREF Section)
TREF column: stainless steel column of 4.3 mm in diameter×150 mm
Column packing material: 100 μm glass beads having the surface treated for inactivation
Heating system: aluminum heat block
Cooling system: Peltier element (cooling of the Peltier element is water-cooling)
Temperature distribution: ±0.5° C.
Temperature controller: digital program controller KP1000 manufactured by CHINO Corporation
(Valve Oven)
Heating system: Air bath type oven
Temperature during measurement: 140° C.
Temperature distribution: ±1° C.
Valve: six-way valve, four-way valve
(Sample Injection Section)
Injection system: loop injection system
Injection amount: loop size 0.1 ml
Inlet heating system: aluminum heat block
Temperature during measurement: 140° C.
(Detection Section)
Detector: wavelength fixed type infrared detector MIRAN 1A, manufactured by FOXBORO
Detection wavelength: 3.42 μm
High temperature flow cell: micro flow cell for LC-IR, optical path length: 1.5 mm, window shape: 2Φ×4 mm long circular, artificial sapphire window plate
Temperature during measurement: 140° C.
(Pump Section)
Liquid-transporting pump: SSC-3461 pump, manufactured by Senshu Scientific Co., Ltd.
Measuring Conditions
Solvent: o-dichlorobenzene (containing 0.5 mg/ml of BHT)
Concentration of sample: 5 mg/ml
Injected amount of sample: 0.1 ml
Flow rate of solvent: 1 ml/min (4) Melting Point (Tm) and Heat of Crystal Fusion (ΔH)

The measurements were made by using a differential scanning calorimeter DSC 220C, manufactured by Seiko Instruments Inc.

5±1 mg of a sample was put in an Al pan and covered with an Al cover, and using an empty Al pan as a reference, it was placed on a detector. The temperature was raised to 200° C. at a rate of 100° C./min. It was held at the same temperature for 5 minutes and then cooled at a rate of 10° C./min, whereby the heat quantity was detected at intervals of 0.5 second till −10° C. It was held at the same temperature for 1 minute and then, heated to 200° C. at a rate of 10° C./min, whereby the heat quantity was detected at intervals of 0.5 second. With each sample, during the cooling process, one heat generation peak was observed, and in the final temperature-raising process, one heat absorption peak was observed. The temperature at the peak top in the final temperature raising process was taken as the melting point (Tm), and from the area of a peak defined by lines connecting the skirts of the peak, the heat of crystal fusion (ΔH) was calculated.

(5) Graft Ratio 200 mg of a polymer and 4,800 mg of chloroform were put into a 10 ml sample bottle and heated at 50° C. for 30 minutes to completely dissolve the polymer. Into a liquid cell made of NaCl and having an optical path length of 0.5 mm, chloroform was put and used as a background. Then, the dissolved polymer solution was put into the liquid cell, and using FT-IR460plus, manufactured by JASCO Corporation, the infrared absorption spectrum was measured by 32 integration times. The graft ratio of maleic anhydride was calculated by using a calibration curve prepared by measuring a solution having maleic anhydride dissolved in chloroform. And, based on a calibration curve separately prepared from the area of the absorption peak of a carbonyl group (the maximum peak in the vicinity of 1,780 cm$^{-1}$, 1,750-1,813 cm$^{-1}$), the content of the acid component in the polymer was calculated, and it was taken as the graft ratio (wt %).

(6) Dispersed Particle Size

It was measured by means of Microtrac UPA manufactured by Nikkiso Co., Ltd. (model 9340, batch type, dynamic light scattering method/laser Doppler method). On such basis that the density of the dispersion was 0.9 g/cm$^3$, the particle shape was spherical, the refractive index of particles was 1.50, the dispersing medium was water, the refractive index of the dispersing medium was 1.33, the measurement was carried out for a measurement time of 120 seconds, and the 50% particle diameter and the 90% particle diameter were obtained on cumulative basis from the finest particle size calculated by volume.

(7) Adhesion (7)-1

A polypropylene of automobile exterior grade was injection-molded to obtain a substrate (test specimen) of 70 mm×150 mm×3 mm, and the substrate surface was cleaned with isopropyl alcohol. A sample was applied thereon by spraying so that the applied amount (the dried weight after application) would be about 15 g/m$^2$. Then, the test specimen after the application was dried and baked for 40 minutes at 80° C. in Safeven drier to obtain a coated plate.

After the plate was left to stand at 23° C. for 24 hours, a test specimen cross-cut with spacing of 2 mm to have 25 sections (5×5) in accordance with the cross-cut adhesion test method disclosed in JIS K 5400, was prepared and, after bonding an adhesive tape (product of Nichiban Co., Ltd.), peeled in a 90° direction, whereby the adhesion was evaluated by the number of cross-cut sections not peeled among 25 cross-cut sections.

(7)-2

A polypropylene of automobile exterior grade was injection-molded to obtain a substrate (test specimen) of 70 mm×150 mm×3 mm, and the substrate surface was cleaned with isopropyl alcohol. A sample was applied thereon by spraying so that the applied amount (the dried weight after application) would be about 10 g/m$^2$, and was dried for 5 minutes at 80° C. in Safeven drier. Then, on the test specimen after coating, an acryl-polyol urethane coating material (RETAN PG80III, manufactured by Kansai Paint Co., Ltd.) having a prescribed curing agent incorporated and further having the viscosity adjusted with a dedicated thinner, was applied by spraying so that the coated amount would be from 25 to 30 g/m$^2$ and baked at 90° C. for 30 minutes to obtain a coated plate.

After the plate was left to stand at 23° C. for 24 hours, a test specimen cross-cut with spacing of 2 mm to have 25 sections (5×5) in accordance with the cross-cut adhesion test method disclosed in JIS K 5400, was prepared and, after bonding an adhesive tape (product of Nichiban Co., Ltd.), peeled in a 90° direction, whereby the adhesion was evaluated by the number of cross-cut sections not peeled among 25 cross-cut sections.

(8) Gasohol Resistance Test

A coated plate prepared in the same manner as in the adhesion test (7)-2 was immersed in a mixed liquid of regular gasoline and ethanol maintained at 20° C. (weight ratio: regular gasoline/ethanol=9/1), whereby the time until the peeling started, was measured and evaluated as follows:

⊚: At least 60 minutes
○: At least 15 minutes and less than 60 minutes
Δ: At least 5 minutes and less than 15 minutes
x: Less than 5 minutes (9) Physical Properties of Coated Film With respect to the substrate used in the adhesion test (7)-2, the substrate surface was cleaned with isopropyl alcohol. A sample was applied thereon by spraying so that the applied amount (the dry weight after application) would be about 10 g/m$^2$, and dried at 80° C. for 30 minutes in Safeven drier to obtain a test specimen. This specimen was left to stand for three days at 40° C., whereupon bleeding out and tackiness were evaluated.

Bleeding Out

The coated test specimen was visually observed, and the appearance of the state of the surfactant bleeded out on the coated surface was observed and judged in accordance with the following standards.

○: No bleeding out of the surfactant
Δ: Slight bleeding out of the surfactant
x: Substantial bleeding out of the surfactant Tackiness The coated test specimen was felt with a finger, and the surface state was judged as follows.

○: No tackiness felt with a finger
x: Tackiness felt with a finger

(10) Heat Sealing Test

Peel Strength

A homopolypropylene (MA3U, manufactured by Japan Polypropylene Corporation) was molded to prepare a polypropylene film having a thickness of 100 μm. Then, 10 g of an emulsion prepared to have a solid content concentration of 25 wt % and diluted by an addition of 5 g of isopropyl alcohol, was applied thereon by a bar coater (No. 16) so that the applied amount (the dried weight after application) would be about 3 g/m$^2$ and dried at 80° C. for 3 minutes in a Safeven drier. Then, the same polypropylene film was overlaid thereon and heat-sealed at a temperature of 120° C. under a pressure of 2 kg/cm$^3$ for a pressing time of 5 seconds.

The heat-sealed laminate was left to stand at 23° C. for 4 hours, and then cut to have a width of 15 mm to obtain a test specimen, and a 180° T-peeling test was carried out at a peeling rate of 300 mm/min, whereby the peel strength was evaluated.

Blocking Resistance

On a film having the emulsion coated and dried in the same manner as in the peeling test, the same polypropylene film was overlaid, and a load of 0.1 kg/cm$^2$ was exerted at 23° C., whereupon the film was peeled with a hand, and the blocking property was evaluated as follows.

○: No blocking observed
Δ: Slight blocking observed
x: Blocking observed, and the films bonded to each other Now, the propylene contents, Mw (calculated as polypropylene), Mw/Mn (calculated as polypropylene), melting points Tm, heat of crystal fusion ΔH, and the eluted amounts at temperatures of at most 60° C. in the temperature rising elution fractionation, of the copolymers (A) and other polymers used in Examples and Comparative Examples are shown in Table 1.

TABLE 1

|  |  | Copolymer 1 | Copolymer 2 | Copolymer 3 | Copolymer 4 | Copolymer 5 | Copolymer 6 | Polymer 7 |
|---|---|---|---|---|---|---|---|---|
| Types of copolymer (A) | | TAFMER XM7070 | TAFMER XM7080 | LICOCENE PP1502 | Chlorinated polyolefin | VESTPLAST 708 | TAFMER XR110T | STEREO-BLOCK PP |
| Propylene content (P) (mol %) | | 73.9 | 78.2 | 90 | 95 | 65 | 73.7 | 100 |
| Weight average molecular weight (Mw) (calculated as PP) | | 240,000 | 237,000 | 28,000 | 69,000 | 49,000 | 291,000 | 157,000 |
| Molecular weight distribution (Mw/Mn) | | 2.2 | 2.2 | 2.2 | 2.3 | 4.0 | 4.1 | 2.6 |
| Integrated eluted amount by temperature rising elution fractionation (wt %) | Till 0° C. | 0.4% | 0.0% | — | — | — | 5.8% | — |
| | Till 10° C. | 0.5% | 0.0% | 78.6% | 100.0% | 72.5% | 7.3% | 12.7 |
| | Till 20° C. | 0.9% | 0.0% | 84.1% | 100.0% | 75.7% | 10.4% | 14.9 |
| | Till 30° C. | 4.3% | 0.3% | 92.6% | 100.0% | 81.1% | 18.4% | 17.6 |
| | Till 40° C. | 93.0% | 9.9% | 98.8% | 100.0% | 87.8% | 29.9% | 22.7 |
| | Till 50° C. | 100.0% | 100.0% | 100.0% | 100.0% | 93.1% | 44.8% | 32.1 |
| | Till 60° C. | 100.0% | 100.0% | 100.0% | 100.0% | 96.1% | 62.4% | 39.2 |
| Melting point (Tm) (° C.) | | 80 | 87 | 76 | Not detected | 78 | 110 | 143 |
| Heat of crystal fusion (ΔH) (J/g) | | 42.4 | 48.7 | 33.8 | 0 | 26.0 | 45.0 | 70.0 |

Example 1

Into a glass flask equipped with a reflux condenser, a thermometer and a stirrer, 650 g of toluene and 350 g of the propylene/butene copolymer (TAFMER XM7070, manufactured by Mitsui Chemicals, Inc.; Copolymer 1) were put, and the interior was substituted with nitrogen gas, and the temperature was raised to 110° C. After raising the temperature, 35 g of maleic anhydride was added, and 10.7 g of t-butylperoxyisopropyl monocarbonate (Perbutyl I, manufactured by NOF Corporation) was added, whereupon stirring was continued at the same temperature for 10 hours to carry out the reaction. After completion of the reaction, the system was cooled to near room temperature, and acetone was added, whereupon the precipitated polymer was collected by filtration. Further, precipitation with acetone and filtration were repeated, and the finally obtained polymer was washed with acetone. The polymer obtained after the washing was dried under reduced pressure to obtain a white powdery maleic anhydride-modified polymer. This modified polymer was subjected to an infrared absorption spectrum measurement, whereby the content (graft ratio) of maleic anhydride groups was 2.1 wt % (0.21 mmol/g as maleic anhydride groups, and 0.42 mmol/g as carboxylic acid groups). Further, the weight average molecular weight was 110,000 (calculated as polypropylene) or 171,000 (calculated as polystyrene), and the number average molecular weight was 90,000 (calculated as polystyrene).

Then, into a glass flask equipped with a reflux condenser, a thermometer and a stirrer, 30 g of the obtained maleic anhydride-modified polymer (content of maleic anhydride groups: 6.3 mmol) and 70 g of toluene were added and completely dissolved by raising the temperature to 110° C. Then, a solution having 6 g (6 mmol, corresponding to 20 parts by weight of the hydrophilic polymer (B) per 100 parts by weight of the copolymer (A)) of methoxypoly(oxyethylene/oxypropylene)-2-propylamine (polyetheramine manufactured by Huntsman Corporation; JEFFAMINE M-1000, molecular weight: 1,000 (nominal value)) dissolved in 6 g of toluene, was added and reacted at 110° C. for 1 hour. Then, 0.53 g (6 mmol) of morpholine was added thereto and reacted at 110° C. for 1 hour.

A small amount was sampled from the reaction solution, and toluene was distilled off under reduced pressure, whereupon an infrared absorption spectrum analysis was carried out, and as a result, it was observed that a peak corresponding to maleic anhydride in the vicinity of 1,784 cm$^{-1}$ was extinct 90%, and the maleic anhydride-modified polymer and the polyether amine were bonded. It is in the form of a graft copolymer having the polyether amine graft-bonded to the maleic anhydride-modified polymer.

While maintaining the temperature of the obtained reaction solution at 60° C., a mixed liquid of 120 g of isopropanol and 30 g of water was dropwise added over a period of 1 hour with stirring under heating to obtain a hazy slightly yellow liquid. Further, a mixed liquid of 30 g of propanol and 160 g of water was dropwise added over a period of 1 hour while maintaining the temperature of the reaction solution at 60° C. to obtain a translucent yellow solution. This solution was cooled to 45° C., and the pressure was reduced gradually from a reduced pressure degree of 0.02 MPa to 0.004 MPa to distill off toluene, isopropanol and water under reduced pressure until the polymer concentration became 25 wt %, thereby to obtain a slightly yellow transparent aqueous resin dispersion. It is considered that the dispersed particle sizes are so fine that the dispersion looks transparent.

The dispersed particle sizes were measured, whereby the 50% particle diameter was 0.099 μm, and the 90% particle diameter was 0.184 μm. The results of evaluation of the adhesion of the obtained aqueous resin dispersion are shown in Table 2. Here, with respect to the adhesion, the evaluation was carried out by the method of (7)-1. Also shown are the propylene content, Mw, Mw/Mn, the melting point Tm, the heat of crystal fusion ΔH and the eluted amount at a temperature of at most 60° C. in the temperature rising elution fractionation, of the propylene/butene copolymer used (TAFMER XM7070, manufactured by Mitsui Chemicals, Inc.)

The methoxypoly(oxyethylene/oxypropylene)-2-propylamine (polyether amine manufactured by Huntsman Corporation: JEFFAMINE M-1000) used in Example 1 had an insoluble content of at most 1 wt %, when dissolved at a concentration of 10 wt % in water of 25° C., and it is a hydrophilic polymer.

Comparative Example 1

A maleic anhydride-modified polymer was obtained in the same manner as in Example 1 except that TAFMER XR110T manufactured by Mitsui Chemicals, Inc. (Copolymer 6) was used as the propylene/butene copolymer. The content (graft ratio) of maleic anhydride groups was 2.0 wt % (0.20 mmol/g as maleic anhydride groups, and 0.40 mmol/g as carboxylic acid groups).

Then, in the same manner as in Example 1, preparation of an aqueous resin dispersion was attempted. However, precipitates having particle diameters of more than 1 mm were observed in a large amount, and no resin dispersion was obtained.

TABLE 2

| | | Example 1 | Comparative Example 1 |
|---|---|---|---|
| Types of copolymer (A) | | TAFMER XM7070 | TAFMER XR110T |
| Propylene content (P) (mol %) | | 73.9 | 73.7 |
| Weight average molecular weight (Mw) (calculated as PP) | | 240,000 | 291,000 |
| Molecular weight distribution (Mw/Mn) | | 2.2 | 4.1 |
| Integrated eluted amount by temperature rising elution fractionation (wt %) | Till 0° C. | 0.4 | 5.8 |
| | Till 10° C. | 0.5 | 7.3 |
| | Till 20° C. | 0.9 | 10.4 |
| | Till 30° C. | 4.3 | 18.4 |
| | Till 40° C. | 93.0 | 29.9 |
| | Till 50° C. | 100.0 | 44.8 |
| | Till 60° C. | 100.0 | 62.4 |
| Melting point (Tm) (° C.) | | 80.0 | 109.8 |
| Heat of crystal fusion (ΔH) (J/g) | | 42.4 | 45.0 |
| Graft ratio (wt %) | | 2.1 | 2.0 |
| 50% Particle diameter (μm) | | 0.099 | Not emulsifiable |
| 90% particle diameter (μm) | | 0.184 | Not emulsifiable |
| Adhesion (7)-1 | | 25/25 | Not coatable |

Example 2

Melt-Modification Step 200 kg of a propylene/butene copolymer (TAFMER XM7070, manufactured by Mitsui Chemicals, Inc.: Copolymer 1) and 5 kg of maleic anhydride were dry-blended by a supermixer, followed by kneading by means of a twin screw extruder (TEX54αII, manufactured by The Japan Steel Works, Ltd.) under such conditions that the cylinder temperature at the kneading section was 200° C., the screw rotational speed was 125 rpm and the discharge rate was 80 kg/hr, while feeding Perbutyl I by a liquid-feeding pump so that it would be 1 part by weight per 100 parts by weight of the propylene/butene copolymer, to obtain a pelletized product.

The content (graft ratio) of maleic anhydride groups in the maleic anhydride-modified propylene/butene copolymer thus obtained was 0.8 wt % (0.08 mmol/g as maleic anhydride groups, and 0.16 mmol/g as carboxylic acid groups). Further, the weight average molecular weight was 156,000, and the number average molecular weight was 84,000 (both calculated as polystyrene).

(Solution-Modification Step)

Then, a reflux condenser, a thermometer, a nitrogen gas-supplying tube and a stirrer were installed on a 2 L glass flask provided with a bottom-discharging valve and an oil-circulation type jacket heater, and then 150 g of the above maleic anhydride-modified propylene/butene copolymer and 150 g of toluene were charged, and heated and stirred until 110° C. while supplying nitrogen gas.

After the temperature rise, 2.25 g of maleic anhydride was added and dissolved, and then, 0.75 g of Perbutyl I was added, followed by continuous stirring at the same temperature for 7 hours. Then, 0.5 g of the solution was withdrawn, and acetone was added, whereupon the precipitated polymer was collected by filtration, and the precipitation with acetone and filtration were further repeated. The finally obtained polymer was dried under reduced pressure. The content (graft ratio) of maleic anhydride groups in this modified polymer was 1.5 wt % (0.15 mmol/g as maleic anhydride groups, and 0.30 mmol/g as carboxylic acid groups). Further, the weight average molecular weight was 146,000, and the number average molecular weight was 77,000 (both calculated as polystyrene).

(Emulsification Step)

Then, the solution was diluted by adding 129 g of toluene, and then, 0.075 g of tetrakis[methylene-3-(3',5'-di-t-butyl-4'-hydroxyphenyl)propionate]methane (Irganox 1010, manufactured by Ciba Specialty Chemical) was added. The jacket temperature (outer temperature) was lowered to 75° C., and 15 g of isopropanol was further added, followed by stirring for 1 hour. Then, 600 g of warm water of 70° C. was added, followed by stirring. After stirring for 15 minutes, the mixture was left to stand still, whereby it was separated into two phases i.e. an upper toluene solution phase and a lower hot water phase. The hot water was withdrawn by the bottom discharge valve. The washing operation with hot water was repeated one more time, and then, to the toluene solution, a solution having 15 g (15 mmol) of JEFFAMINE M-1000 dissolved in 390 g of isopropanol, was dropwise added over a period of 1 hour. Further, an aqueous solution having 1.5 g (15 mmol) of a 90% aqueous solution of 2-amino-2-methyl-1-propanol (AMP90) dissolved in 90 g of water was added.

Between the reflux condenser and the flask, a Dean Stark tube was installed, and the obtained liquid was distilled under reduced pressure to remove 90 g of the solvent, and then 90 g of water was added. This process was repeated five times. Thereafter, 60 g of water was further added, and toluene, isopropanol and water were distilled under reduced pressure until the polymer concentration became 30 wt %, thereby to obtain a white aqueous dispersion.

The results of evaluation of the dispersed particle sizes, the coating physical properties, the adhesion and the gasohol resistance of the obtained aqueous resin dispersion are shown in Table 3. Here, with respect to the adhesion, the evaluation was carried out by the method of (7)-2.

Example 3

A hazy slightly yellow aqueous dispersion was obtained in the same manner as in Example 2 except that the amount of JEFFAMINE M-1000 used, was changed from 15 g to 22.5 g (22.5 mmol).

The evaluation results of the obtained aqueous resin dispersion are shown in Table 3.

Example 4

A hazy slightly yellow aqueous dispersion was obtained in the same manner as in Example 2 except that the amount of JEFFAMINE M-1000 used, was changed from 15 g to 30 g (30 mmol).

The evaluation results of the obtained aqueous resin dispersion are shown in Table 3.

Example 5

A milky white aqueous dispersion was obtained in the same manner as in Example 2 except that instead of JEFFAMINE M-1000 as the hydrophilic polymer used, SURFONAMINE L-200 (polyether amine manufactured by Huntsman Corporation, molecular weight: 2,000) was used, and the amount used was 45 g (22.5 mmol).

The evaluation results of the obtained aqueous resin dispersion are shown in Table 3.

Example 6

The melt-modification step was carried out in the same manner as in Example 2, to obtain a maleic anhydride-modified propylene-butene copolymer having a maleic anhydride group content of 0.8 wt % and a weight average molecular weight of 156,000.

Then, a reflux condenser, a thermometer, a nitrogen-supplying tube and a stirrer were installed on a 1 L glass flask, 200 g of the above maleic anhydride-modified propylene/butene copolymer and 200 g of toluene were charged, and heated and stirred until 110° C. while supplying nitrogen gas.

After the temperature rise, 10 g of maleic anhydride and 3.0 g of Perbutyl I were added. Thereafter, this operation was repeated every 30 minutes for 3 times (a total of four times), and then stirring was continued at the same temperature for 7 hours to carry out the reaction.

After completion of the reaction, the reaction solution was cooled so that the temperature (inner temperature) became 50° C., and 600 g of acetone was dropwise added over a period of about 1 hour, whereupon a slight red suspension was obtained. After removing the liquid by a suction filtration apparatus, the remaining white solid was suspended in 500 g of acetone and stirred for 30 minutes. The liquid was again removed by a suction filtration apparatus, the remaining solid was put into a Teflon-coated vat and dried in a reduced pressure drier at 60° C. to obtain a modified polymer.

The content (graft ratio) of maleic anhydride groups in this modified polymer was 5.8 wt % (0.58 mmol/g of maleic anhydride groups and 1.16 mmol/g of carboxylic acid groups), and the weight average molecular weight was 89,000, and the number average molecular weight was 44,000 (both calculated as polystyrene).

150 g of this maleic anhydride-modified propylene/butene copolymer and 500 g of THF were charged into a 2 L glass flask equipped with a reflux condenser, a thermometer and a stirrer and heated and completely dissolved at 65° C. To the obtained solution, 33 g (0.37 mol) of morpholine was added, followed by stirring at the same temperature for 30 minutes. Then, 500 g of water was added over a period of 2 hours to obtain a slightly yellow solution.

At a jacket temperature (outer temperature) of 60° C., the obtained liquid was distilled under reduced pressure to remove THF and a part of water, to obtain an aqueous dispersion having a polymer concentration of 30 wt %.

The evaluation results of the obtained aqueous resin dispersion are shown in Table 3.

Example 7

A propylene/butene copolymer (TAFMER XM7080, manufactured by Mitsui Chemicals, Inc.; Copolymer 2) was subjected to the melt-modification step under the same condition as in Example 2. The obtained maleic anhydride-modified propylene/butene copolymer had a content (graft ratio) of maleic anhydride groups of 0.8 wt %, a weight average molecular weight of 158,000 and a number average molecular weight of 91,000 (both calculated as polystyrene).

Then, under the same conditions as in Example 3, the solution-modification step and the emulsification step were carried out. The content (graft ratio) of maleic anhydride groups in the obtained modified polymer was 1.5 wt % (0.15 mmol/g of maleic anhydride groups, and 0.30 mmol/g of carboxylic acid groups), and the weight average molecular weight was 148,000, and the number average molecular weight was 78,000 (both calculated as polystyrene). The obtained aqueous dispersion had a hazy slightly yellow color.

The evaluation results of the obtained aqueous resin dispersion are shown in Table 3.

Example 8

Into a 1 L glass flask equipped with a reflux condenser, a thermometer and a stirrer, 150 g of toluene and 100 g of the propylene/ethylene copolymer (LICOCENE PP1502, manufactured by Clariant International Ltd.; Copolymer 3) were put, and the interior was substituted with nitrogen gas, and the temperature was raised to 110° C. After raising the temperature, 5.0 g of maleic anhydride was added, and 2.0 g of Perbutyl I was added, whereupon stirring was continued at the same temperature for 10 hours to carry out the reaction. After completion of the reaction, the system was cooled to near room temperature, and acetone was added, whereupon the precipitated polymer was collected by filtration. Further, precipitation with acetone and filtration were repeated, and the polymer obtained after the washing was dried under reduced pressure to obtain a white powdery maleic anhydride-modified polymer. This modified polymer had a content (graft ratio) of maleic anhydride groups of 1.3 wt % (0.13 mmol/g as maleic anhydride groups, and 0.26 mmol/g as carboxylic acid groups). Further, the weight average molecular weight was 45,000 and the number average molecular weight was 27,000 (both calculated as polystyrene).

Then, into a 1 L glass flask equipped with a reflux condenser, a thermometer and a stirrer, 40 g of the obtained maleic anhydride-modified polypropylene (content of maleic anhydride groups: 10.4 mmol), 0.02 g of Irganox 1010 and 60 g of toluene were added and completely dissolved by raising the temperature to 110° C., and then, the jacket temperature (outer temperature) was lowered to 70° C. Then, a solution having 6 g (6 mmol) of JEFFAMINE M-1000 dissolved in 200 g of isopropanol, was dropwise added over a period of 1 hour.

Thereafter, an aqueous solution having 0.4 g (4 mmol) of N,N-dimethylethanolamine dissolved in 40 g of water, was added. Then, between the reflux condenser and the flask, a Dean Stark tube was installed, and then 40 g of the solution was distilled off under reduced pressure, and then 40 g of water was added. Such a process was repeated five times. Thereafter, toluene, isopropanol and water were distilled off under reduced pressure until the polymer concentration became 30 wt %, thereby to obtain a white aqueous dispersion.

The evaluation results of the obtained aqueous resin dispersion are shown in Table 3.

Example 9

A reflux condenser, a thermometer, a nitrogen gas supply tube and a stirrer were installed on a 2 L glass flask provided with a bottom-discharge valve and an oil-circulation type jacket heater, 100 g of a chlorinated propylene/ethylene copolymer (Copolymer 4, chlorine content: 27 wt %) and 150 g of toluene were charged, and heated and stirred until 110° C. while supplying nitrogen gas.

After the temperature rise, 5.0 g of maleic anhydride was added and dissolved, and 2.0 g of Perbutyl I was added, followed by continuous stirring at the same temperature for 7 hours. Thereafter, 0.5 g of the solution was withdrawn, and acetone was added thereto, whereupon the precipitated polymer was collected by filtration. Further, precipitation with acetone and filtration were repeated, and the finally obtained polymer was dried under reduced pressure. This modified polymer had a content (graft ratio) of maleic anhydride groups of 0.9 wt % (0.09 mmol/g of maleic anhydride groups, and 0.18 mmol/g of carboxylic acid groups). Further, the weight average molecular weight was 93,000, and the number average molecular weight was 58,000 (both calculated as polystyrene).

Then, the solution was diluted by addition of 50 g of toluene, and then, 0.05 g of Irganox 1010 was added. The jacket temperature (outer temperature) was lowered to 70° C., and 600 g of warm water of 70° C. was added, followed by stirring. After continuously stirring for 15 minutes, the mixture was left to stand still, and warm water was withdrawn from the bottom discharge valve. The washing operation with warm water was repeated once more, and then, to the solution, a solution having 20 g (20 mmol of JEFFAMINE M-1000 dissolved in 250 g of isopropanol, was dropwise added over a period of 1 hour. Further, an aqueous solution having 1.0 g (10 mmol) of AMP 90 dissolved in 60 g of water, was added.

Between the reflux condenser and the flask, a Dean Stark tube was installed, and the obtained liquid was distilled under reduced pressure to remove 60 g of the solvent, and 60 g of water was added, and such a process was repeated five times. Thereafter, toluene, isopropanol and water were distilled off under reduced pressure until the polymer concentration became 30 wt %, to obtain a slightly yellow aqueous dispersion.

The evaluation results of the obtained aqueous resin dispersion are shown in Table 3.

Comparative Example 2

Maleic acid-modification and emulsification were carried out in the same manner as in Example 9 except that as the polyolefin, a propylene/butene/ethylene copolymer (VESTPLAST 708, manufactured by Degussa Japan; Copolymer 5) was used. The content (graft ratio) of maleic anhydride groups in this modified polymer was 1.3 wt % (0.13 mmol/g as maleic anhydride groups, and 0.26 mmol/g as carboxylic acid groups). Further, the weight average molecular weight was 56,000, and the number average molecular weight was 22,000 (both calculated as polystyrene). A milky white aqueous dispersion was obtained, but during the emulsification, a large amount of agglomerates were formed, and after removing them by a metal net of 400 mesh, the dispersion was used for evaluation of the performance.

The evaluation results of the obtained aqueous resin dispersion are shown in Table 3.

Comparative Example 3

20 g of the maleic anhydride-modified propylene/butene copolymer obtained in the melt-modification step in Example 2 and 60 g of toluene were put into a container, and the interior of the container was substituted by nitrogen gas, and the temperature was raised to 75° C. for dissolution. After the dissolution, the solution was cooled to 50° C., and then 5 g of a polyoxyethylene cetyl ether (nonionic surfactant, EMULGEN 220, manufactured by Kao Corporation, HLB=14.2) and 7.1 g of a polyoxyethylene alkyl ether (nonionic surfactant, EMULGEN 1118S70, manufactured by Kao Corporation (70% aqueous solution), HLB=16) (5.0 g as surfactant component) were added and dissolved.

While maintaining the temperature at 50° C., 12 g of distilled water was added thereto, and then emulsification was carried out at a rotational speed of 12,000 for 5 minutes by a homomixer. Then, an aqueous solution having AMP90 (0.4 g) diluted with water (150 g) was added into the system to adjust the pH to 8. This crude emulsified product was subjected to gradual evacuation at a temperature of 50° C. to distill off toluene and water thereby to obtain a milky white resin dispersion having a polymer concentration of 25 wt %.

The evaluation results of the obtained aqueous resin dispersion are shown in Table 3.

Comparative Example 4

(1) Chemical Treatment of Clay Mineral

Into a 300 ml round bottomed flask, deionized water (125 ml), lithium sulfate monohydrate (19.3 g) and sulfuric acid (29.8 g) were introduced and dissolved with stirring. To this solution, commercially available granulated montmorillonite (Benclay SL manufactured by Mizusawa Industrial Chemicals, Ltd., 33.5 g) was dispersed, and the temperature was raised to boiling over a period of 10 minutes, followed by stirring for 300 minutes at a boiling point (105° C.). Then, 200 ml of deionized water was added for cooling, and the obtained slurry was subjected to filtration to recover a wet cake. The recovered wet cake was re-slurried by deionized water (800 ml) in a 1,000 ml beaker, followed by filtration. This operation was repeated twice. The finally obtained cake was dried in air at 100° C. for 3 hours to obtain a chemically treated montmorillonite (25.9 g).

(2) Preliminary Polymerization

The chemically treated montmorillonite (2.0 g) obtained in the above (1) was dried under reduced pressure at 200° C. for 2 hours. A toluene solution of trioctyl aluminum (0.5 mmol/ml, 5.7 ml) was added thereto, followed by stirring at 60° C. for 40 minutes. To this suspension, toluene (30 ml) was added, followed by stirring, and then the supernatant was removed. This operation was repeated twice to obtain a clay slurry.

Into a separate flask, triisobutylaluminum (0.076 mmol), manufactured by TOSO AKZO, and dichloro{1,1'-dimethylsilylene[2-methyl-1-indenyl][2-methyl-4-phenyl-4H-azulenyl]}hafnium (adjusted to exo-syn/exo-anti-=5/5 (mol ratio) (Preparation Method: see JP-A-2005-48033) (26.7 mg, 37.9 µmol) were added and preliminarily reacted to obtain a toluene solution. The entire amount of this complex solution was added to the above clay slurry, followed by stirring at room temperature for 1 hour. To this suspension, toluene (15 ml) was added, followed by stirring, and then the supernatant was removed. This operation was repeated twice to obtain a catalyst slurry.

Then, the entire amount of the above catalyst slurry was introduced into an induction stirring autoclave having an internal capacity of 2 L. Toluene (100 ml) containing triisobutylaluminum (0.35 mmol) was introduced, and into the autoclave, liquefied propylene (35 ml) was introduced at 35° C. to carry out preliminary polymerization at 35° C. for 30 minutes. The obtained preliminarily polymerized catalyst slurry was recovered in a 200 ml round-bottomed flask, and the supernatant was removed, followed by washing with toluene (80 ml) containing triisobutylaluminum (0.016 mmol). This preliminarily polymerized catalyst contained 5.1 g of polypropylene per 1 g of the solid catalyst component.

(3) Polymerization of Propylene

Into an induction stirring autoclave having an internal capacity of 2 L, 105 g of isotactic polypropylene dried at 100° C. was introduced as a dispersing agent, followed by replacement with nitrogen under reduced pressure. Then, triisobutylaluminum (0.25 mmol) was introduced, and into a catalyst feeder mounted in the autoclave, the above-mentioned preliminarily polymerized catalyst was introduced in an amount of 83.7 mg as the solid catalyst component. The autoclave was heated, and at 50° C., from the catalyst feeder, the preliminarily polymerized catalyst was introduced into the autoclave, and while introducing propylene, the autoclave was further heated. After raising the temperature to 75° C., the pressure was adjusted to 1.9 MPa, and the reaction was continued at the same temperature for 60 minutes. During the reaction, propylene gas was introduced so that the pressure became constant. Upon completion of the reaction, an unreacted monomer was purged to terminate the polymerization, and the initially introduced isotactic propylene was removed by sieving to obtain 53 g of a stereo-block polypropylene (Polymer 7) having the physical properties as shown in Table 1. MFR of this polymer was 28.2 g/10 min.

(4) Modification, Emulsification

Into a 1 L glass flask equipped with a reflux condenser, a thermometer and a stirrer, 186 g of toluene and 100 g of the stereo-block polypropylene (Polymer 7, stereoregularity: 79 mol % of isotactic pentad) were put, and the interior was substituted with nitrogen gas, and the temperature was raised to 110° C. After raising the temperature, 6 g of maleic anhydride was added, and 2 g of Perbutyl I was added, whereupon stirring was continued at the same temperature for 7 hours to carry out the reaction. After completion of the reaction, the system was cooled to 80° C., and acetone was added, whereupon the precipitated polymer was collected by filtration. Further, precipitation with acetone and filtration were repeated. The polymer obtained after the washing was dried under reduced pressure to obtain a white powdery maleic-anhydride-modified polymer. This maleic anhydride-modified polypropylene did not dissolve in chloroform and was, therefore, formed into a film at 200° C. by means of a 0.1 mm spacer. The content (graft ratio) of maleic anhydride groups was 1.5 wt % (0.15 mmol/g as maleic anhydride groups, and 0.3 mmol/g as carboxylic acid groups).

Then, into a glass flask equipped with a refractive condenser, a thermometer and a stirrer, 30 g of the obtained maleic anhydride-modified polypropylene (content of maleic anhydride groups: 4.5 mmol) and 70 g of toluene were added. The temperature was raised to 70° C., but the polypropylene was not dissolved, and therefore, the temperature was raised to 110° C. to completely dissolve the polypropylene. Then, a solution having 6 g (6 mmol) of JEFFAMINE M-1000 dissolved in 6 g of toluene, was added and reacted at 110° C. for 1 hour.

The obtained reaction solution was cooled to a temperature of 80° C., and a mixed liquid of 120 g of isopropanol and 30 g of water was dropwise added over a period of 1 hour. Further, a mixed solution of 30 g of isopropanol and 160 g of water was dropwise added over a period of 1 hour while maintaining the temperature of the reaction solution at 80° C., to obtain a suspension wherein a large amount of visually-detectable agglomerates were precipitated. This suspension was gradually evacuated at the same temperature from a reduced pressure degree of 0.02 MPa to 0.004 MPa to distill off toluene, isopropanol and water under reduced pressure until the polymer concentration became 30 wt %, thereby to obtain a white suspension.

The agglomerates were collected by filtration with a metal net of 400 mesh and dried under reduced pressure to 80° C. for 4 hours to obtain 25.8 g of white solid, and most of the white suspension was particles of at least 10 µm.

The dispersed particle sizes were not measurable, and the subsequent evaluation was also impossible.

TABLE 3

|  |  | Ex. 2 | Ex. 3 | Ex. 4 | Ex. 5 | Ex. 6 | Ex. 7 |
|---|---|---|---|---|---|---|---|
| Copolymer (A) | Type | Copolymer 1 | Copolymer 1 | Copolymer 1 | Copolymer 1 | Copolymer 1 | Copolymer 2 |
|  | Amount (*1) | 100 | 100 | 100 | 100 | 100 | 100 |
| Melt-modification conditions | MAH (*1) | 2.5 | 2.5 | 2.5 | 2.5 | 2.5 | 2.5 |
|  | PBI (*1) | 1 | 1 | 1 | 1 | 1 | 1 |
|  | Graft ratio (wt %) | 0.8 | 0.8 | 0.8 | 0.8 | 0.8 | 0.8 |

TABLE 3-continued

|  |  |  |  |  |  |  |  |
|---|---|---|---|---|---|---|---|
| Solution-modification conditions | MAH (*1) | 1.5 | 1.5 | 1.5 | 1.5 | 20 | 1.5 |
|  | PBI (*1) | 0.5 | 0.5 | 0.5 | 0.5 | 7 | 0.5 |
|  | Graft ratio (wt %) | 1.5 | 1.5 | 1.5 | 1.5 | 5.8 | 1.5 |
| Molecular weight after modification (calculated as Pst) | Mw | 146,000 | 146,000 | 146,000 | 146,000 | 89,000 | 148,000 |
|  | Mn | 77,000 | 77,000 | 77,000 | 77,000 | 44,000 | 78,000 |
| Hydrophilic polymer | Type | M-1000 | M-1000 | M-1000 | L-200 | Morpholine | M-1000 |
|  | Mn | 1000 | 1000 | 1000 | 2000 | 89 | 1000 |
|  | Amount (*1) | 10 | 15 | 20 | 30 | 22 | 15 |
| Emulsification |  | Good | Good | Good | Good | Good | Good |
| Filtration efficiency |  | Good | Good | Good | Good | Good | Good |
| 50% Particle diameter (μm) |  | 0.110 | 0.042 | 0.026 | 0.100 | 0.041 | 0.049 |
| 90% Particle diameter (μm) |  | 0.156 | 0.080 | 0.037 | 0.220 | 0.063 | 0.068 |
| Adhesion (7)-2 |  | No peeling | No peeling | No peeling | No peelng | No peeling | No peeling |
| Gasohol resistance |  | ⊚ | ⊚ | ○ | ⊚ | ○ | ⊚ |
| Tackiness |  | ○ | ○ | ○ | ○ | ○ | ○ |
| Bleeding out |  | ○ | ○ | ○ | ○ | ○ | ○ |

|  |  | Ex. 8 | Ex. 9 | Comp. Ex. 2 | Comp. Ex. 3 | Comp. Ex. 4 |
|---|---|---|---|---|---|---|
| Copolymer (A) | Type | Copolymer 3 | Copolymer 4 | Copolymer 5 | Copolymer 1 | Polymer 7 |
|  | Amount (*1) | 100 | 100 | 100 | 100 | 100 |
| Melt-modification conditions | MAH (*1) |  | Nil |  | 2.5 | Nil |
|  | PBI (*1) |  |  |  | 1 |  |
|  | Graft ratio (wt %) |  |  |  | 0.8 |  |
| Solution-modification conditions | MAH (*1) | 5 | 5 | 5 | Nil | 6 |
|  | PBI (*1) | 2 | 2 | 2 |  | 2 |
|  | Graft ratio (wt %) | 1.3 | 0.9 | 1.3 |  | 1.5 |
| Molecular weight after modification (calculated as Pst) | Mw | 45,000 | 93,000 | 56,000 | 156,000 | Not dissolved in THF |
|  | Mn | 27,000 | 58,000 | 22,000 | 83,000 |  |
| Hydrophilic polymer | Type | M-1000 | M-1000 | M-1000 | Surfactant | M-1000 |
|  | Mn | 1000 | 1000 | 1000 |  | 1000 |
|  | Amount (*1) | 15 | 20 | 20 | 50 | 20 |
| Emulsification |  | Good | Good | Substantial agglomerates No good | Good | Not emulsifiable |
| Filtration efficiency |  | Good | Good | No good | Good | Not carried out |
| 50% Particle diameter (μm) |  | 0.058 | 0.289 | 0.195 | 0.255 | Not measurable |
| 90% Particle diameter (μm) |  | 0.107 | 0.397 | 0.300 | 0.400 | Not measurable |
| Adhesion (7)-2 |  | No peeling | No peeling | No peeling | No peeling | Not measurable |
| Gasohol resistance |  | Δ | ○ | ○ | ⊚ | Not measurable |
| Tackiness |  | ○ | ○ | X | X | Not measurable |
| Bleeding out |  | ○ | ○ | ○ | X | Not measurable |

MAH: Maleic anhydride
PBI: Perbutyl I
*1: parts by weight

<Heat Sealing Test>

With respect to the aqueous resin dispersions obtained in Examples 8 and 9 and Comparative Examples 2 and 3, the heat sealing properties were evaluated. The evaluation results are shown in Table 4.

The aqueous resin dispersions of Examples 8 and 9 had high peel strength and good blocking resistance and thus were confirmed to be excellent as a heat sealing adhesive.

TABLE 4

|  |  | Ex. 8 | Ex. 9 | Comp. Ex. 2 | Comp. Ex. 3 |
|---|---|---|---|---|---|
| Peel strength (g/15 min) | 120° C. | 700 | 470 | 260 | 40 |
| Blocking resistance |  | ○ | ○ | X | Δ |

INDUSTRIAL APPLICABILITY

The resin dispersion of the present invention is very useful for e.g. a surface treating agent, adhesive, coating agent or coating material, for an olefin polymer having crystallinity. Further, the laminate of the present invention is excellent in the coating adhesion and is applicable to a wide range of industrial products.

The entire disclosure of Japanese Patent Application No. 2006-066106 filed on Mar. 10, 2006 including specification, claims and summary is incorporated herein by reference in its entirety.

The invention claimed is:

1. A resin dispersion having, dispersed in water with a 50% particle diameter of at most 0.5 μm, a polymer (C) having a hydrophilic polymer (B) bonded to a propylene/α-olefin copolymer (A) as a copolymer of propylene with an α-olefin other than propylene, wherein the hydrophilic polymer (B) is a polyether resin having an amino group as a reactive group, wherein:
the copolymer (A) has a propylene content of at least 50 mol % and less than 100 mol % and the copolymer (A) has a weight average molecular weight Mw of at least 10,000 and a molecular weight distribution Mw/Mn of at most 3.5 and a heat of crystal fusion ΔH of at most 60 J/g and at least 10 J/g;
the resin dispersion has a surfactant content of at most 15 parts by weight per 100 parts by weight of the polymer (C),
an amount of the hydrophilic polymer (B) bonded to the copolymer (A) is from 0.01 to 0.3 mmol/g per 1 g of the copolymer (A),
the copolymer (A) elutes at least 95% at a temperature of at most 60° C. in temperature rising elution fractionation,
the copolymer (A) elutes at most 20% at a temperature of at most 30° C. in temperature rising elution fractionation, and
the copolymer (A) is produced by means of a single-site catalyst.

2. The resin dispersion according to claim 1, wherein the copolymer (A) has a melting point Tm of at most 100° C.

3. The resin dispersion according to claim 1, wherein the copolymer (A) contains substantially no chlorine.

4. The resin dispersion according to claim 1, wherein the polymer (C) is dispersed in water with a 50% particle diameter of at most 0.3 μm.

5. The resin dispersion according to claim 1, wherein the polymer (C) has a hydrophilic polymer (B) bonded to the copolymer (A) in a ratio of (A):(B)=100:1 to 100:500 (weight ratio).

6. The resin dispersion according to claim 1, wherein the polymer (C) is a graft copolymer having a hydrophilic polymer (B) graft-bonded to the copolymer (A).

7. The resin dispersion according to claim 1, which contains substantially no surfactant.

8. The resin dispersion according to claim 1, wherein the copolymer (A) elutes at most 20% at a temperature of at most 20° C. in temperature rising elution fractionation.

9. The resin dispersion according to claim 1, wherein the copolymer (A) has a weight average molecular weight of at least 50,000.

10. A coating material containing the resin dispersion according to claim 1.

11. A laminate having the coating material according to claim 10, on a thermoplastic resin-molded product (F).

12. A laminate having a resin layer formed by applying and heating the resin dispersion according to claim 1, on a thermoplastic resin-molded product (F).

13. The resin dispersion according to claim 1, wherein the copolymer (A) elutes at most 5% at a temperature of at most 20° C. in temperature rising elution fractionation, at most 10% at a temperature of at most 30° C. in temperature rising elution fractionation, and at least 97% at a temperature of at most 60° C. in temperature rising elution fractionation.

14. A laminate having formed on a thermoplastic resin-molded product (F) a layer comprising a polymer (C) having a hydrophilic polymer (B) bonded to a propylene/α-olefin copolymer (A) as a copolymer of propylene with an α-olefin other than propylene,
wherein:
the hydrophilic polymer (B) is a polyether resin having an amino group as a reactive group, wherein the copolymer (A) has a propylene content of at least 50 mol % and less than 100 mol %, an amount of the hydrophilic polymer (B) bonded to the copolymer (A) is from 0.01 to 0.3 mmol/g per 1 g of the copolymer (A), and the copolymer (A) has a weight average molecular weight Mw of at least 10,000 a molecular eight distribution Mw/Mn of at most 3.5 and a heat of crystal fusion ΔH of at most 60 Jig and at least 10 J/g;
a surfactant content is at most 15 parts by weight per 100 parts by weight of the polymer (C);
the copolymer (A) elutes at least 95% at a temperature of at most 60° C. in temperature rising elution fractionation, and the copolymer (A) is produced by means of a single-site catalyst.

15. A process for producing a laminate, which comprises applying and heating the resin dispersion according to claim 1, to form a resin layer on a thermoplastic resin-molded product (F).

16. A process for producing a laminate, which comprises applying the coating material according to claim 10 on a thermoplastic resin-molded product (F).

* * * * *